(12) United States Patent
Bielenberg et al.

(10) Patent No.: US 10,630,557 B2
(45) Date of Patent: Apr. 21, 2020

(54) VIRTUAL NETWORK MANAGEMENT

(71) Applicant: Nicira, Inc., Palo Alto, CA (US)

(72) Inventors: Max Bielenberg, San Mateo, CA (US); Pere Monclus, San Jose, CA (US); Sushil Singh, Mountain View, CA (US); Jorge Jaramillo, San Jose, CA (US); Carolina Pena, San Francisco, CA (US); Arslan Waqar, Islamabad (PK); Dragos Rusu, Suceava (RO); Duyen Riggs, San Jose, CA (US); Syed Khayam, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 252 days.

(21) Appl. No.: 15/292,064

(22) Filed: Oct. 12, 2016

(65) Prior Publication Data

US 2017/0111236 A1    Apr. 20, 2017

Related U.S. Application Data

(60) Provisional application No. 62/243,299, filed on Oct. 29, 2015.

(51) Int. Cl.
| | |
|---|---|
| *H04L 12/24* | (2006.01) |
| *H04L 29/08* | (2006.01) |
| *G06F 9/455* | (2018.01) |
| *G06F 16/951* | (2019.01) |
| *H04L 12/26* | (2006.01) |

(52) U.S. Cl.
CPC .......... *H04L 41/22* (2013.01); *G06F 9/45558* (2013.01); *G06F 16/951* (2019.01); *H04L 41/12* (2013.01); *H04L 67/36* (2013.01); *G06F 2009/45595* (2013.01); *G06F 2203/04803* (2013.01); *H04L 43/08* (2013.01)

(58) Field of Classification Search
None
See application file for complete search history.

(56) References Cited

U.S. PATENT DOCUMENTS 5,394,522 A * 2/1995 Sanchez-Frank ........... G06F 17/30289
707/E17.032
5,909,217 A * 6/1999 Bereiter ................ G06F 3/0489
345/440

(Continued)

*Primary Examiner* — Yongjia Pan
(74) *Attorney, Agent, or Firm* — Patterson & Sheridan, LLP

(57) ABSTRACT

A network management system manages a virtual network includes an interface system communicatively coupled to one or more servers, a director engine, and a configuration engine. The one or more servers implement a virtual network including one or more virtual machines and one or more containers organized into one or more virtual domains. The interface system generates a graphical user interface displaying graphical representations of the one or more virtual machines and the one or more containers and of the one or more servers; and information associated with the virtual network. The director engine receives a user selection of at least one server, virtual machine, container, or virtual domain, accesses information associated with the user selection, and identifies one or more of servers, virtual machines, containers, and virtual domains associated with the user selection.

18 Claims, 18 Drawing Sheets

(56) References Cited

U.S. PATENT DOCUMENTS

| | | | | |
|---|---|---|---|---|
| 6,067,093 A * | 5/2000 | Grau | | G06T 11/206 345/440 |
| 6,310,881 B1 * | 10/2001 | Zikan | | H04L 45/02 370/236 |
| 7,065,482 B2 * | 6/2006 | Shorey | | H04L 43/00 703/2 |
| 7,593,013 B2 * | 9/2009 | Agutter | | G06T 11/206 345/440 |
| 7,681,130 B1 * | 3/2010 | Lavallee | | H04L 41/22 715/735 |
| 7,936,694 B2 * | 5/2011 | Choudhury | | H04L 29/06027 370/252 |
| 7,984,423 B2 * | 7/2011 | Kodosky | | G05B 19/0426 715/763 |
| 8,031,634 B1 * | 10/2011 | Artzi | | H04L 12/4641 370/254 |
| 8,108,733 B2 * | 1/2012 | Richmond | | G06F 11/0709 707/737 |
| 8,671,176 B1 * | 3/2014 | Kharitonov | | H04L 45/02 709/219 |
| 8,838,764 B1 * | 9/2014 | Johnston | | H04L 41/0866 709/223 |
| 8,891,528 B2 * | 11/2014 | Moriarty | | H04L 43/0852 370/392 |
| 9,363,148 B2 * | 6/2016 | Somaiya | | H04L 41/22 |
| 9,628,436 B1 * | 4/2017 | Britt | | H04L 61/1511 |
| 9,641,450 B1 * | 5/2017 | Brandwine | | G06F 9/5077 |
| 9,787,546 B2 * | 10/2017 | Bardgett | | H04L 41/12 |
| 2002/0161885 A1 * | 10/2002 | Childers | | H04L 12/2825 709/224 |
| 2003/0167278 A1 * | 9/2003 | Baudel | | G06T 11/206 |
| 2005/0114508 A1 * | 5/2005 | DeStefano | | G06F 17/2705 709/224 |
| 2006/0195297 A1 * | 8/2006 | Kubota | | G06F 16/95 702/187 |
| 2007/0156860 A1 * | 7/2007 | Nedelcu | | H04L 41/12 709/220 |
| 2009/0013281 A1 * | 1/2009 | Helfman | | G06Q 10/10 715/788 |
| 2010/0122175 A1 * | 5/2010 | Gupta | | H04L 41/0893 715/735 |
| 2011/0252327 A1 * | 10/2011 | Awasthi | | H04L 43/045 715/736 |
| 2011/0314148 A1 * | 12/2011 | Petersen | | G06F 11/3476 709/224 |
| 2012/0030363 A1 * | 2/2012 | Conrad | | H04L 12/6418 709/228 |
| 2013/0283175 A1 * | 10/2013 | Faridian | | H04L 67/1095 715/736 |
| 2013/0300747 A1 * | 11/2013 | Wong | | G06T 11/206 345/440.2 |
| 2014/0010109 A1 * | 1/2014 | Himura | | H04L 41/12 370/254 |
| 2014/0108985 A1 * | 4/2014 | Scott | | G06F 3/0484 715/771 |
| 2015/0043378 A1 * | 2/2015 | Bardgett | | H04L 12/4641 370/254 |
| 2015/0046826 A1 * | 2/2015 | Mann | | H04L 41/12 715/734 |
| 2015/0333987 A1 * | 11/2015 | Fletcher | | H04L 43/045 709/224 |
| 2016/0239336 A1 * | 8/2016 | Bingham | | G06F 9/45533 |
| 2016/0253078 A1 * | 9/2016 | Ebtekar | | G06T 11/206 715/735 |
| 2016/0294603 A1 * | 10/2016 | Whitner | | H04L 43/024 |
| 2016/0352634 A1 * | 12/2016 | Itsumi | | H04L 12/6418 |

* cited by examiner

*FIG. 5b*

300    Aug 21 23:36:30

Traffic Health – Virtual Domain
Virtual Machines (129)

Health Indicators

Warnings  Alerts  Directors  Edges  Virtual Domains

Health Log

| Timestamp | Object | Condition |
|---|---|---|
| <1 min ago | VD:LM Staging • Flounder 08 | Packet Drops 15/m |
| <1 min ago | VD:LM Staging • Flounder 09 | Packet Drops 15/m |
| <1 min ago | Director 1 • Process 04 | CPU>90% |
| <1 min ago | Director 2 • Process 04 | CPU>90% |
| <1 min ago | Edge 192.34.67.1 | CPU>95% |
| <1 min ago | Edge 912.34.67.1 | Latency>50ms |
| <1 min ago | Edge 912.34.67.1 | Latency>50ms |
| <1 min ago | Edge 912.34.67.1 | Packet Drops>15/m |
| <1 min ago | Edge 912.34.67.1 | CPU>95% |
| <1 min ago | VD:LM Staging • Flounder 07 | Packet Drops>15/m |
| <1 min ago | VD:LM Staging • Flounder 08 | Packet Drops>15/m |
| <1 min ago | VD:LM Staging • Flounder 09 | Packet Drops>15/m |
| <1 min ago | Director 2 • Process 04 | CPU>90% |

Internet (2)

Other Zones (2)    Other Virtual Domains (5)

VIRTUAL NETWORK MANAGEMENT

CROSS-REFERENCE TO RELATED APPLICATION(S)

This application claims the benefit of U.S. Provisional Application 62/243,299, "Virtual Network Management," filed Oct. 19, 2015, which is incorporated by reference herein in its entirety.

BACKGROUND

1. Field of Art

The disclosure generally relates to the field of virtual networks, and specifically to the management of the relationship between virtual machines and containers in a virtual network and physical machines.

2. Background Information

The reliable operation and management of large-scale computing system networks is an increasingly challenging problem. A typical large-scale system including thousands of servers, racks, and network elements serves many different applications and customers. Software layers such as network virtualization, virtual machines, and containers enable such applications to be deployed more quickly and efficiently. Applications typically have reliability requirements; however, the interdependency between physical layers (servers, racks, network elements) and software layers (network virtualization, virtual machine, and containers) increase the complexity of understanding, monitoring and debugging applications.

Each of these layers can generate detailed logs, can perform events, and can be configured into various states. Information included in these logs and describing these events and states can provide a high level of visibility into the system, which in turn can be used to detect, root cause, and remediate problems with applications. However, this volume of information can be too large for operators to inspect manually. System operators need essential tools that can analyze, summarize, and visualize such information.

BRIEF SUMMARY OF THE DISCLOSURE

One embodiment of a network management system for managing a virtual network includes an interface system communicatively coupled to one or more servers. The one or more servers implement a virtual network including one or more virtual machines and one or more containers organized into one or more virtual domains. The interface system generates a graphical user interface displaying graphical representations of the one or more virtual machines and the one or more containers in a first portion of the graphical user interface. The graphical user interface displays graphical representations of the one or more servers in a second portion of the graphical user interface. The graphical user interface displays information associated with the virtual network in a third portion of the graphical user interface. The network management system includes a director engine that receives, from a user of the network management system, a selection of at least one server, virtual machine, container, or virtual domain. The director engine queries instrumentation data such as instrumentation data collected from logs stored by the one or more servers to access information associated with the selected at least one server, virtual machine, container, or virtual domain. The director engine queries the one or more servers to identify one or more of servers, virtual machines, containers, and virtual domains associated with the selected at least one server, virtual machine, container, or virtual domain. The director engine modifies the first portion of the graphical user interface and the second portion of the graphical user interface to highlight the selected at least one server, virtual machine, container, or virtual domain, and to highlight the identified one or more servers, virtual machines, containers, and virtual domains associated with the selected server, virtual machine, container, or virtual domain. The director engine modifies the third portion of the graphical user interface to display the accessed information associated with the selected server, virtual machine, container, or virtual domain. The network management system further includes a configuration engine that re-configures the selected server, virtual machine, container, or virtual domain in response to a request from the user of the network management system.

One embodiment of a computer-implemented method of managing a virtual network implemented by one or more servers that includes one or more virtual machines and one or more containers organized into one or more virtual domains, includes generating, by a network management system, a graphical user interface displaying graphical representations of the one or more virtual machines and the one or more containers in a first portion of the graphical user interface. The graphical user interface displays graphical representations of the one or more servers in a second portion of the graphical user interface. The graphical user interface displays information associated with the virtual network in a third portion of the graphical user interface. The method receives, from a user of the network management system, a selection of at least one server, virtual machine, container, or virtual domain. The method queries instrumentation data stored by the one or more servers to access information associated with the selected at least one server, virtual machine, container, or virtual domain. The method queries the one or more servers to identify one or more of servers, virtual machines, containers, and virtual domains associated with the selected at least one server, virtual machine, container, or virtual domain. The method modifies the first portion of the graphical user interface and the second portion of the graphical user interface to highlight the selected at least one server, virtual machine, container, or virtual domain, and to highlight the identified one or more servers, virtual machines, containers, and virtual domains associated with the selected server, virtual machine, container, or virtual domain. The method modifies the third portion of the graphical user interface to display the accessed information associated with the selected server, virtual machine, container, or virtual domain. The method re-configures the selected server, virtual machine, container, or virtual domain in response to a request from the user of the network management system.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIGS. 5a through 5d illustrate interfaces displaying connections between virtual network entities, according to one embodiment.

DETAILED DESCRIPTION OF THE DISCLOSURE

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Computing Machine Architecture

Figure 1:
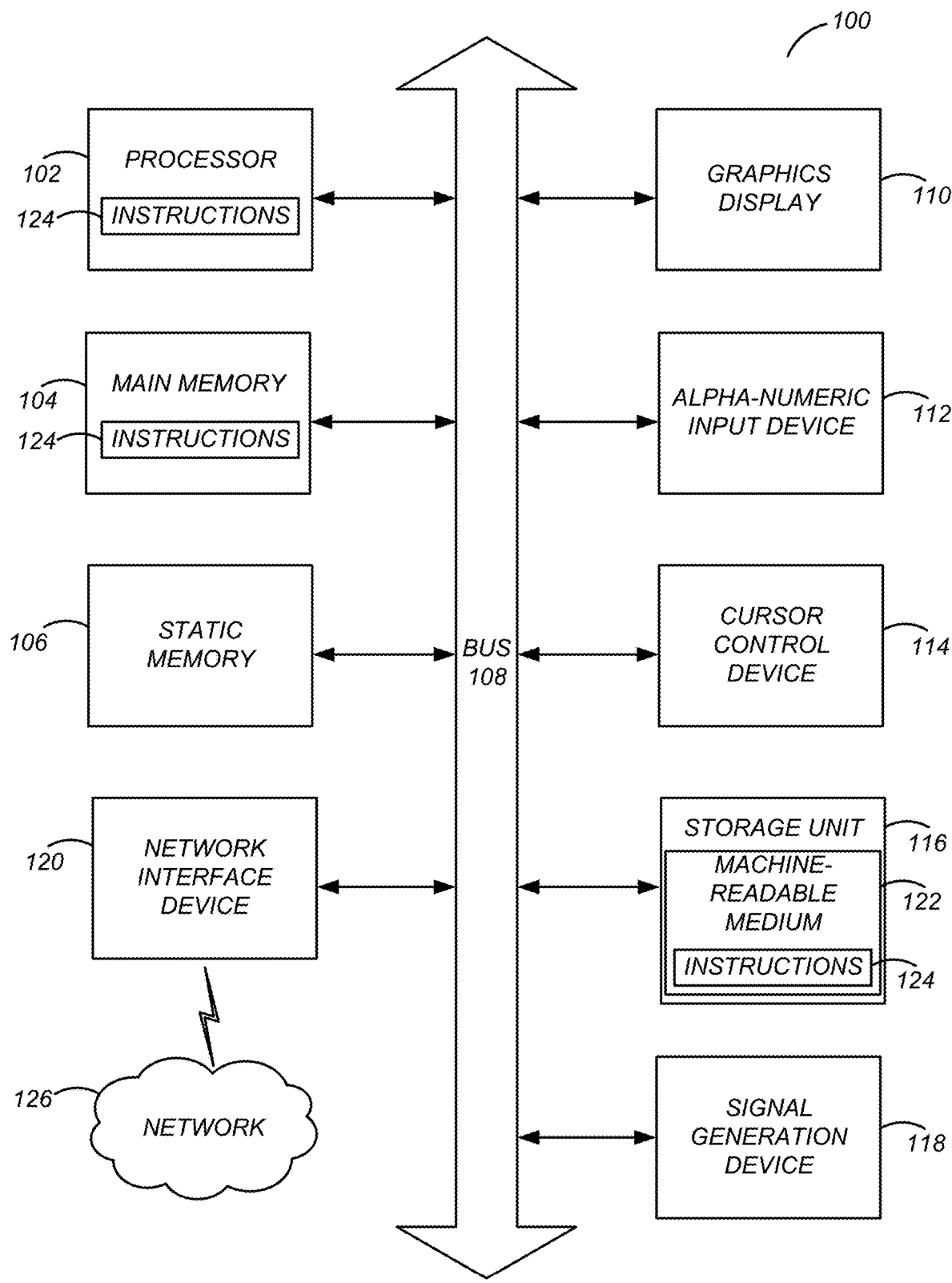
FIG. 1 illustrates one embodiment of components of an example computer system.

FIG. 1 is a block diagram illustrating components of an example computer system. The computer system includes one or more processors 102 (or controllers, or similar processing components configured to execute computer program instructions). The processes can be embodied as computer program code (or computer readable instructions) or as modules. The modules may be hardware modules that include hardware for operating the functions described. Alternately, or in addition, the modules can be software modules which are executable by the processor.

As shown in FIG. 1, a computer system 100 includes instructions 124 (e.g., software) for causing the computer system to perform any one or more of the methodologies discussed herein. The computer system 100 can be a stand-alone computer system (such as a laptop computer, desktop computer, or mobile device), or can be a networked computer system (such as a server) communicatively coupled to one or more other computer systems, for instance within a data center. In a network environment, the computer system may operate in the capacity of a server machine or a client machine, or as a peer machine in a peer-to-peer (or distributed) network environment. As used herein, "physical machine" can refer to a computer system, such as a server computer.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a non-transitory computer-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

Virtual Network Environment

Figure 2:
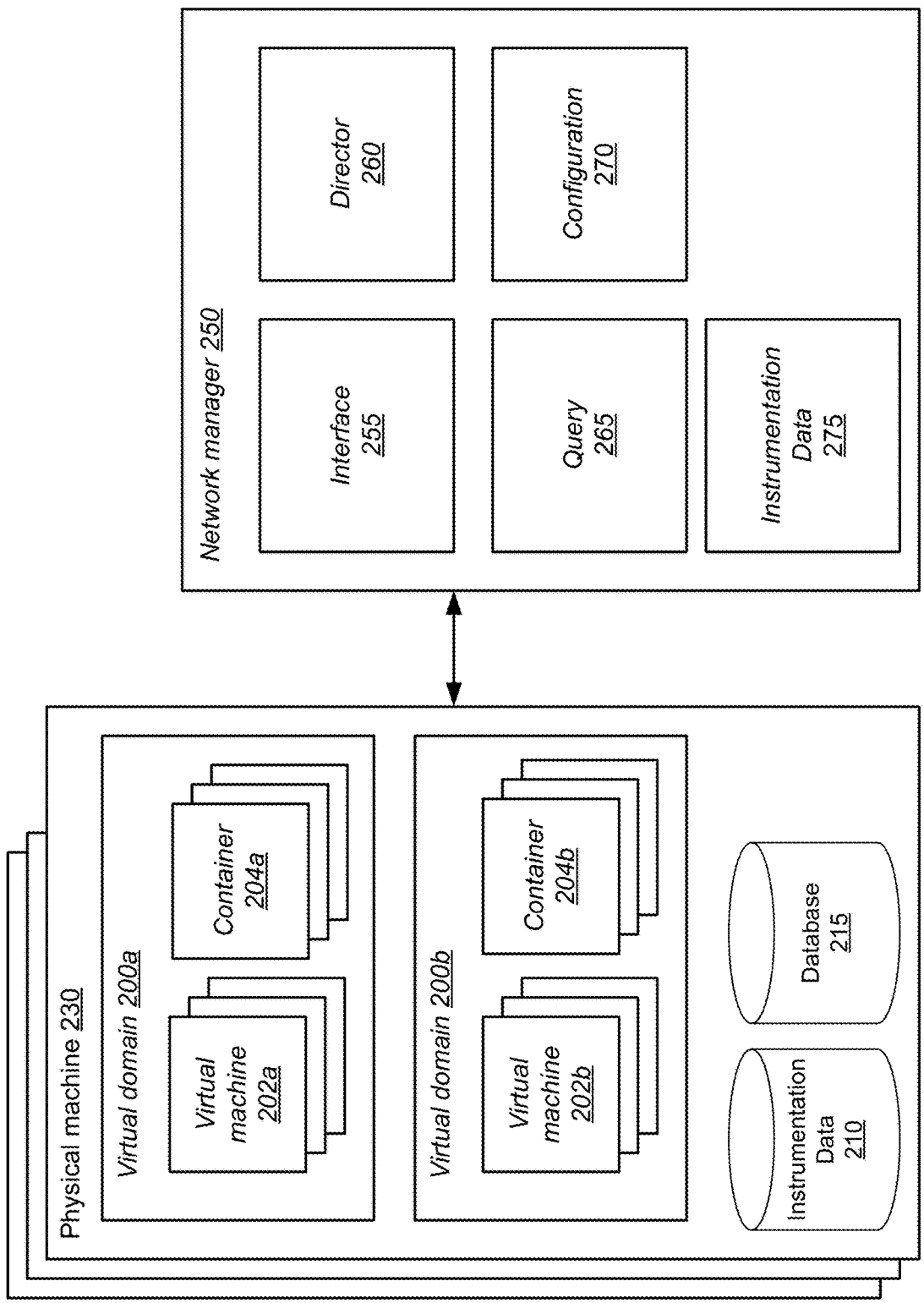
FIG. 2 illustrates a virtual network environment, according to one embodiment.

FIG. 2 illustrates a virtual network environment, according to one embodiment. In the embodiment of FIG. 2, a set of one or more physical machines 230 implement virtual domains 200a and 200b, each with one or more virtual machines 202a and 202b, respectively. The virtual domains 200a and 200b may each further include one or more containers 204a and 204b, respectively. The virtual domains 200a and 200b are referred together herein as a virtual domain or virtual domains 200. The virtual machines 202a and 202b are referred together herein as a virtual machine or machines 200a. The containers 204a and 204b are referred together herein as a container or containers 204. Each physical machine can include any suitable computer system, such as a server, and the set of physical machines 230 can be co-located (for instance within a data center), or can be geographically dispersed. A virtual domain 200 can be implemented by one or by more than one physical machine 230, and each virtual machine 202 can be implemented by one or more than one physical machine. As used herein, "virtual network" refers to the organization of and communicative coupling between the physical machines 230, the virtual domains 200, and the virtual machines. It should be noted that although the embodiments described herein are limited to the instantiation of virtual machines 202 within virtual domains 200, the principles described herein apply equally to embodiments where the set of physical machines 230 implement virtual machines 202 that are not explicitly organized into virtual domains.

Each virtual domain 200 includes a set of virtual machines 202 (and/or containers 204) and virtual network and security components (such as bridges, routers, network address translation components, firewalls, ACLs, and other network components, not illustrated in FIG. 2) configured to enable the communication between the virtual machines 202 (and/or containers 204) included in the virtual domain 200, and between the virtual machines 202 (and/or containers 204) and entities outside of the virtual domain 200. In some embodiments, virtual domains 200 are implemented using the OPENSTACK platform, though it should be emphasized the virtual domains described herein can be implemented using any suitable platform, program, or language. In some embodiments, the virtual machines as described herein include system virtual machines (emulating one or more operating systems and underlying computer hardware), and process virtual machines (emulating a computing environment configured to implement one or more programs, applications, or tasks). The containers as described herein are implementations of operating system-level virtualizations such as LXC containers, Docker containers, and the like. It should be noted that in some embodiments, any number of physical machines 230 (such as hundreds or thousands) can implement any number of virtual domains 200, each including any number of virtual machines 202 and/or any number of container 204.

The set of physical machines 230 further includes an instrumentation data storage module 210 and a database 215. The instrumentation data storage module 210 stores information associated with the virtual domains 200, the virtual machines 202, the containers 204 ("virtual network entities" hereinafter), and information associated with the physical machines 230 ("physical network entities" hereinafter). For example, the instrumentation data storage module 210 can store virtual network entity configuration information (such as virtual network entity identity, operating system, hardware confirmation, status of a virtual machine IP address lease, and the like), virtual network entity event information (such as virtual network entity errors, warnings, communication events, process crashes, the establishment of a data flow, data flow security violations or other security violations, data flow timeouts and ends, license expirations, the detection of duplicate IP addresses for a virtual network entity, and the like), properties corresponding to virtual network entities (such as data input/output rates, CPU rates, memory consumption rates, number of packets dropped, the addition or removal of virtual machines and/or virtual domains, physical or virtual connectivity issues, and the like), properties corresponding to the virtual network (such as a network interface status—up, down, or failure), properties corresponding to the network manager system (such as a status of a network manager system component), network traffic (such as packets received at a virtual network entity, packets received at a physical machine, packets sent by a virtual network entity, packets sent by a physical machine), or any other information describing or associated with a virtual network entity and/or a physical machine. The database 215 stores data accessed by, processed by, and stored by one or more virtual network entities. It should be noted that in some embodiments, one or more of the instrumentation data storage module 210 and the database 215 are located within the network manager 250, or within another entity external to the set of physical machines 230.

The physical machines 230 (and by proxy, the virtual machines 202) are communicatively coupled to a network manager 250. The network manager 250 can be a special-configured system configured to implement the functionalities described herein. In some embodiments, the networking manager 250 is a combination of one or more of a hardware system (such as a web server or application server) and an application configured to run on a hardware system. In some embodiments, the network manager 250 is implemented within a physical machine 230, while in other embodiments, the network manager 250 is implemented within an entity external to and/or independent of the physical machines 230.

In the embodiment of FIG. 2, the networking manager 250 includes an interface module 255, a director module 260, a query module 265, a configuration module 270, and a log generation module 275. It should be noted that in other embodiments, the network manager 250 includes components other than those illustrated in FIG. 2. The interface module 255 is configured to provide various interfaces between the entities of FIG. 2, and between entities of FIG. 2 and external entities (such as a user of the network manager 250). For instance, the interface module 255 is configured to provide a communicative interface between networking manager 250 and between the physical machines 230 (and by proxy, the virtual machines 202). Further, the interface module 255 is configured to provide a graphical user interface ("GUI") for display to a user of the network manager 250, referred to herein as a "virtual network interface" as illustrated in FIGS. 3a through 6c. The interface module 255 is also configured to receive input from a user of the network manager 250, for instance in response to the display of a virtual network interface, and to display an updated virtual network interface in response.

The director module 260 is configured to generate content for display within a virtual network interface displayed by the interface module 255. In some embodiments, the director module 260 queries the physical machines 230 to access the identities of the physical machines 230, the identities of the virtual domains 200, the identities of the virtual machines 202, and the identities of the containers 204. The director module 260 then queries a mapping stored by the physical machines 230 to identify one or more of: 1) the set of one or more physical machines that implement each virtual machine, 2), the set of one or more physical machines that implement each container, 3) the set of one or more physical machines that implement each virtual domain, 4) the set of one or more virtual machines (and/or containers) implemented by each physical machine, 5) the set of virtual machines (and/or containers) within each virtual domain, and 6) the set of physical machines within each server rack, data center, or other organization of physical machines. In some embodiments, a user selects (via the interface module 255) a virtual network entity (such as a physical machine, a virtual machine, a container, and a virtual domain), and in response, the director module 260 queries a mapping stored by one or more physical machines to identify virtual network entities associated with the selected virtual network entity (such as a physical machine 230 that implements a selected virtual machine 202).

In some embodiments, each physical machine 230 stores a mapping (for instance in a data table) that identifies virtual machines 202 (or containers 204) implemented by the physical machine. In addition, one or more physical machines 230 can store a mapping that identifies each virtual domain 200 within the virtual network, and that identifies each virtual machine 202 (or container 204) within each virtual domain. In some embodiments, each physical machine 230 includes a kernel-level component that stores a mapping between virtual network entities, while in other embodiments, a user space agent corresponding to the network manager 250 and implemented by each physical machine stores such a mapping, either independently of or in conjunction with a kernel-level component mapping. In some embodiments, one or more physical machines 230 stores a universal mapping that maps one or more of: each physical machine within the virtual network to the one or more virtual machines (and/or containers) implemented by the physical machine, each virtual domain within the virtual network to the virtual machines (and/or containers) within the virtual domain, and each virtual domain within the virtual network to the physical machines that implement virtual machines (and/or containers) within the virtual domain. It should be noted that in some embodiments, the mappings described herein are stored by the network manager 250.

The director module 260 is also configured to access information corresponding to virtual network entities, for instance from the instrumentation data storage module 210. In some embodiments, the director module 260 accesses information corresponding to a virtual network entity (e.g., a virtual machine, a container), in response to a user's selection of a virtual network entity displayed within a network interface by a user of the network manager 250. For example, if a user of the network manager 250 selects a physical machine displayed within a network interface displayed by the interface module 255 (for instance, by selecting text or an icon representative of the physical machine), the director module 260 can query the instrumentation data storage module 210 for information corresponding to the selected physical machine, such as an identity of the selected physical machine, network traffic of the selected physical machine, resource (e.g. memory, CPU) usage of the selected physical machine, and the like. Likewise, if a user of the network manager 250 selects a virtual machine 202 (container 204, or virtual domain 200), the director module 260 can query the instrumentation data storage module 210 for information corresponding to the selected virtual machine 202 (container 204, or virtual domain 200).

The director module 260 can additionally query the instrumentation data storage module 210 to identify a status of a physical machine, a virtual machine, a container, and/or a virtual domain. In some embodiments, the status of a virtual network entity can be determined based on a comparison of a property or characteristic of the virtual network entity to a value or threshold (for instance, a pre-determined value or threshold or a user-selected value or threshold). For example, if a CPU usage for a particular physical machine exceeds a pre-determined threshold, the director module 260 can flag or classify the physical machine with a "warning" status. If traffic associated with a particular virtual machine is above a predetermined threshold, the director module 260 can flag or classify the virtual machine with a "warning" status. Likewise, if a data processing rate for a particular virtual machine falls below a pre-determined threshold, the director module 260 can flag or classify the virtual machine with a "malfunctioning" status. The director module 260 can configure a network interface displayed by the interface module 255 to indicate the status of one or more of the physical machines, the virtual machines, the containers, and the virtual domains. In some embodiments, information corresponding to status of a virtual network entity (such as the cause of the status, any harm or danger corresponding the status, and/or any available remedies corresponding to the status) can be displayed in response to the selection of the virtual network entity.

The director module 260 can also identify and flag a status of a physical machine correlating to a status of a corresponding virtual machine. For example, if the director module 260 determines that the data processing rate for a particular virtual machine falls below a pre-determined threshold, the director module 260 can query the physical machines implementing the virtual machine, can determine that a property or characteristic of the physical machine is affecting the performance of the virtual machine, and can classify the status of the physical machine accordingly. The director module 260 can configure a network interface displayed by the interface module 255 to indicate that the status of the virtual machine is correlated to the status of the physical machine, beneficially informing a user of the network manager 250 of the relationship between the status of the virtual machine and the physical machine, and enabling the user to take remedial action with regards to one or both of the physical machine and virtual machine if necessary.

The director module 260 can further query the instrumentation data storage module 210 to identify network traffic associated with a virtual machine, a container, and/or a virtual network entity group that includes at least one virtual entity (e.g., a virtual machine or a container). The director module 260 can determine a security status of the virtual machine, the container, and/or the virtual domain by comparing the network traffic to one or more access rules associated with the virtual machine, the container, and/or the virtual domain. For example, if a virtual machine is being accessed by another virtual machine that is not identified by the access rules associated with the virtual machine, the director module 260 may flag or classify the virtual machine with a "warning" status. The director module 260 can determine an access status of the network traffic by comparing a time interval of the network traffic to a threshold time interval. Responsive to determining that the time interval of the network traffic is longer (or shorter) than the threshold time interval, the director module 260 may flag or classify the network traffic associated with the virtual machine with a "long term" (or "short term") status. The director module 260 can configure a network interface displayed by the interface module 255 to indicate the access status of one or more of the virtual machines, the containers, and/or the virtual network entity groups.

The director module 260 can configure the network interface displayed by the interface module 255 based on the virtual network information accessed by the director module 260. For instance, in some embodiments, each virtual machine 202 (or container 204) within the virtual network identified by the director module 260 can be displayed as a rectangle or other shape or graphical representation within a cluster corresponding to a virtual domain 200 to which each virtual machine below within a first interface portion. Likewise, each physical machine 230 within the virtual network identified by the director module 260 can be represented by a rectangle within a cluster corresponding to a server rack within a second interface portion. In addition, information corresponding to a selected network entity that is accessed by the director module 260 can be displayed within a third interface portion. The director module 260 may display a list of real-time events occurring within the virtual network within a third interface portion. The list of real-time events may be generated according to a user's input. In response to a selection of a real-time event, the director module 260 may highlight the corresponding network entity in the first interface portion and/or the second interface portion. Examples of network interfaces are illustrated in greater detail in FIGS. 3a-6c.

The director module 260 is also configured to access data accessed, processed, and/or stored by a virtual network entity, for instance from the database 215. In some embodiments, the director module 260 accesses data corresponding to a virtual network entity in response to the selection of a virtual network entity displayed within a network interface by a user of the network manager 250. For example, if a user of the network manager 250 selects a virtual machine displayed within a network interface displayed by the interface module 255 (for instance, by selecting text or an icon representative of the virtual machine), the director module 260 can query the database 215 to access data processed by the virtual machine (such as inventory entries, account numbers, and the like), and can update the network interface to display the accessed data.

The query module 265 receives queries from a query field displayed in a network interface by the interface module 255, and performs searches of virtual network entities, log entries, and/or other instrumentation data based on the received queries (or partial queries). The instrumentation data can be collected from instrumentations of various types such as logs, active probes (e.g., system service probes, Application Program Interface (API) probes, traffic probes, etc.), or passive probes (user- or kernel-level monitoring agents, Link Layer Discovery Protocol (LLDP) traffic, broadcast or multicast traffic, etc.) In some embodiments, in response to receiving a query or partial query, the query module 265 queries the instrumentation data storage module 210 to identify one or more virtual network entities and/or one or more log entries corresponding to information (such as a property or characteristic of the virtual network entities) that match the query or partial query. For instance, if a user provides the partial query term "VM_1" into a search query field, the query module 265 can query the instrumentation data storage module 210 with the partial query term "VM_1" to identify all virtual network entities that include "VM_1" within an identifier for each virtual network entity, within an operating system name of each virtual network entity, within a network address for each virtual network entity, and the like. In some embodiments, the query module 265 queries the database 215 to identify data that matches the query or partial query and that is stored by or processed by a virtual network entity. The query module 265 can configure the interface displayed by the interface 255 to highlight virtual network entities identified in response to a query, and/or to display data within the database 215 identified in response to a query. It should be noted that the query module 265 can provide additional search functionality, including filtering search results or data sets, performing operations on queried data, and correlating events occurring within the virtual network with one or more virtual machines and/or physical machines.

The configuration module 270 enables a user of the network manager 250 to take one or more actions in response to the selection of a virtual network entity, for instance a virtual network entity associated with a detrimental status. For example, a user can select a virtual machine classified as "improperly configured", or a physical machine classified as "powered down", and can take an action in response to the selection of the virtual network entity. The configuration module 270 can enable a user to perform one or more actions with regards to a selected virtual network entity, including but not limited to: resetting a virtual network entity, implementing a virtual machine on a different physical machine, assigning a virtual machine to a different virtual domain, re-configuration or altering the configuration of a virtual network entity, enabling one or more security protocols, debugging or tracing a virtual network entity, and installing a software component, application, patch, or update on a virtual network entity. After the configuration module 270 performs one or more actions with regards to a selected virtual network entity in response to a request from a user of the network manager 250, the director module 260 can update the network interface to reflect that the action was taken and to reflect an updated status of the selected virtual network entity.

The instrumentation data generation module 275 generates instrumentation data such as log entries that can subsequently be stored in the instrumentation data storage module 210. The log store information associated with virtual network entities as well as information associated with physical entities. In some embodiments, the log generation module 275 monitors all network traffic (i.e., data packets communicated) between virtual entities, between virtual entities and physical entities, and between physical entities, and generates logs storing the monitored network traffic. Each log entry is associated with log entry parameters such as a time stamp, a network entity associated with the log entry, a description of the event, a source network entity, a destination network entity, a communication protocol, a status of a packet, and the like.

Virtual Network Management

Figure 3A:
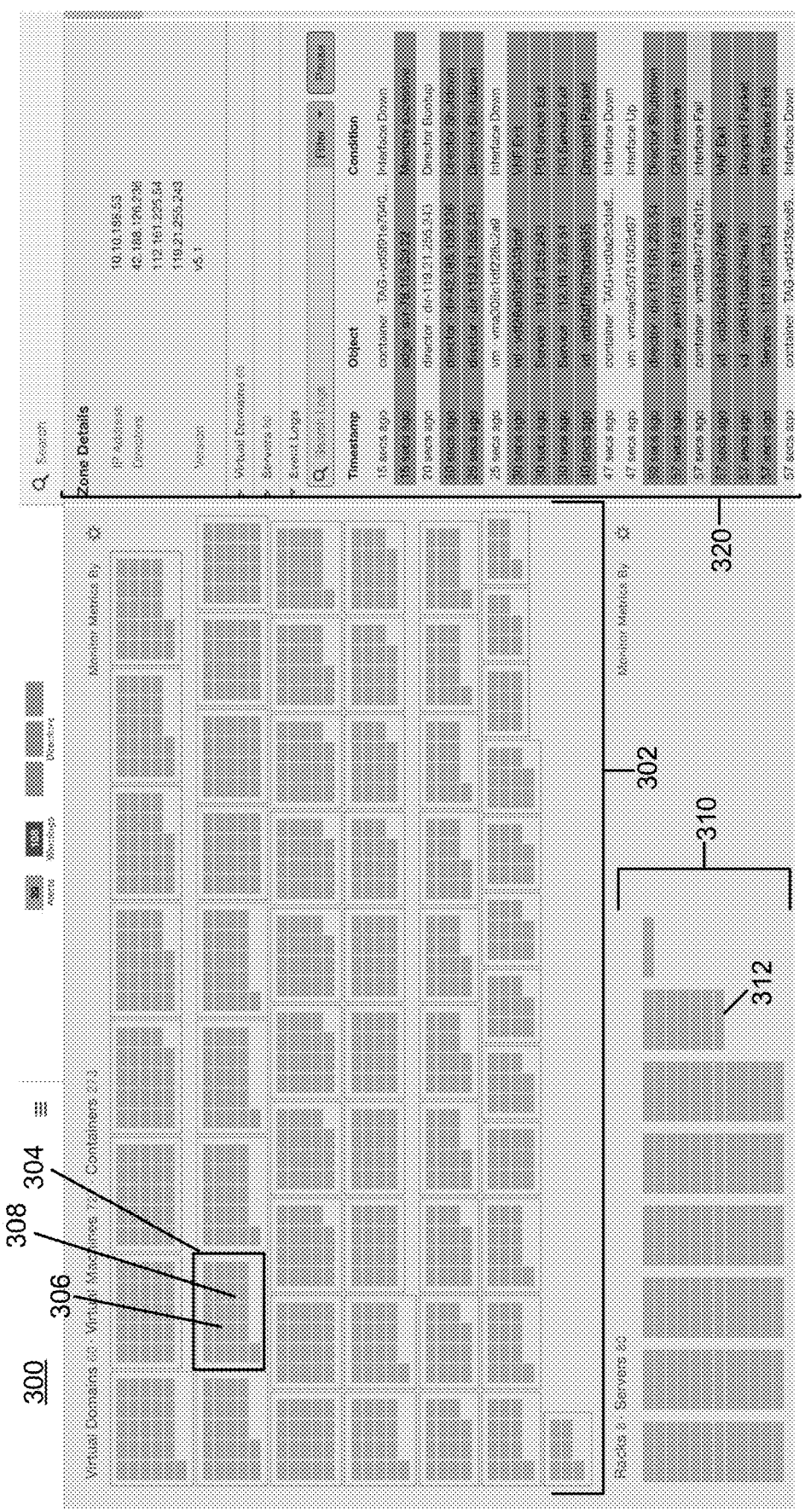
FIG. 3*a* illustrates an interface displaying virtual network entities and associated physical network entities, according to one embodiment.

As described above, the director module 260 of the network manager 250 can configure one or more network interfaces for display by the interface module 255 to a user of the network manager. FIGS. 3a-6c herein illustrate examples of such network interfaces. FIG. 3a illustrates an interface displaying virtual network entities including virtual domains, virtual machines, containers, and associated physical network entities, according to one embodiment. In the embodiment of FIG. 3a, an interface 300 displays virtual domains in a first interface portion 302, physical machines in a second interface portion 310, and virtual network detailed information in a third interface portion 320.

In the embodiment of FIG. 3a, 60 virtual domains are illustrated within the first interface portion 302. Each virtual domain (such as the virtual domain 304) is illustrated as a set of clustered rectangles. Each rectangle represents a virtual machine (e.g., the virtual machine 306) or a container (e.g., the container 308). In other embodiments, any number of virtual domains can be displayed, each with any number of virtual machines and/or containers. The number of virtual domains and the number of virtual machines can be displayed within the first interface portion 302 (for instance, in the upper left portion of the first interface portion).

In the embodiment of FIG. 3a, 6 server racks are illustrated within the second interface portion 310. Each server rack is illustrated as a column of rectangles, and each rectangle represents a physical machine (such as server 312). In other embodiments, any number of racks including any number of physical machines can be displayed. The number of server racks and the number of servers can be illustrated within the second interface portion 310 (for instance, in the upper left portion of the second interface portion). It should be noted that in other embodiments, the clusters of virtual machines, the columns of server racks, the virtual machines, and the physical machines can be represented using any suitable shape, organization, or graphic representation.

In the embodiment of FIG. 3a, virtual network detailed information is displayed within the third interface portion 320. For example, information about the IP address or domain of the virtual network can be displayed in a first sub-portion of the third interface portion 320, virtual domain information can be displayed in a second sub-portion of the third interface portion (the "virtual domain" sub-portion), server information can be displayed in a third sub-portion of the third interface portion (the "server" sub-portion), and event log information can be displayed in a fourth sub-portion of the third interface portion (the "event log" sub-portion). In such embodiments, the virtual domain sub-portion, the server sub-portion, and the event log sub-portion are expandable and collapsible such that when one of these sub-portions is first selected, the sub-portion expands within the third interface portion 320 and detailed information corresponding to the selected sub-portion is displayed within the expanded sub-portion. Likewise, when the selected sub-portion is subsequently selected again, the sub-portion can collapse within the third interface portion 320. In the embodiment of FIG. 3a, the event log sub-portion is selected, displayed detailed information about events within the virtual network.

Detailed event information includes time stamps, objects (e.g., virtual machines, containers, virtual domains, edges, services, directors, etc.) and information associated with objects, and conditions. Information associated with objects includes, for example, identifiers, IP addresses, and the like. Events are generated in response to that the objects are detected to operate abnormally (e.g., an interface is down, memory usage is excessive, CPU usage is excessive, dropped packets, and the like). The conditions describe operation statuses of the objects that trigger generation of the events. The events are displayed with different shades (or different colors) that are determined based on the significance (or priority) of the events. More significant events require more immediate user attention as the corresponding network entities may perform abnormally without user intervention, and may disrupt a user's experience. In some embodiments, in response to a user's selection of an event in the third interface portion 320, any corresponding network entities are highlighted in the first interface portion 302 or second interface portion 310. It should be noted that events can be classified based on any number of statuses associated with various objects, based on any object property or characteristic, or based on any performance metric. Such classifications can be represented using any suitable colors (for instance, each status can be represented by a different color), or by any other graphic representation (such as a pattern, an animation, a texture, an icon, a highlighted icon, and the like).

Figure 3B:
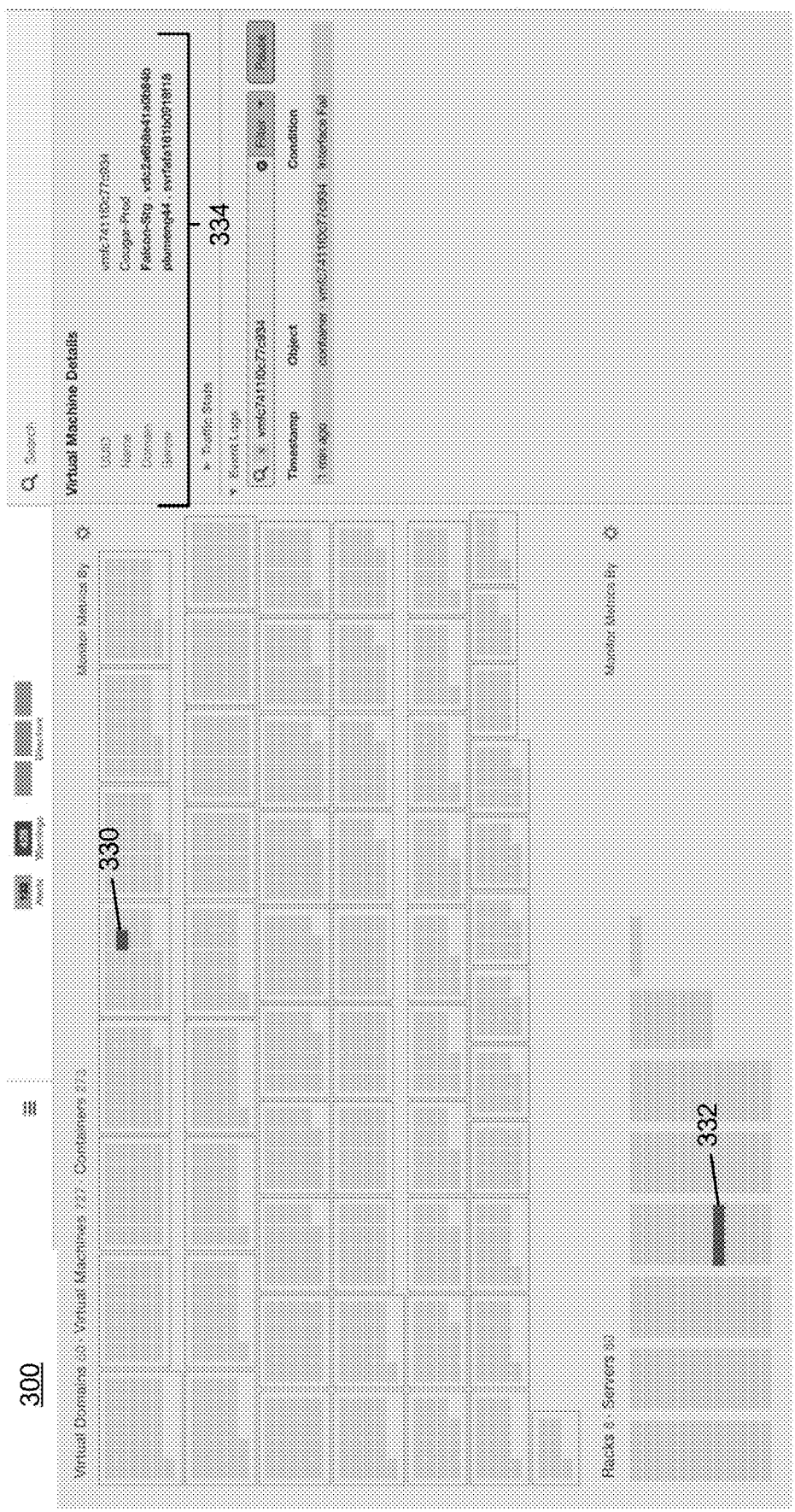
FIG. 3b illustrates the interface of FIG. 3a with a virtual network entity selected and a corresponding physical network entity highlighted, according to one embodiment.

FIG. 3b illustrates the interface of FIG. 3a with a virtual network entity selected and a corresponding physical network entity highlighted, according to one embodiment. In the interface 300, one or more virtual network entities can be selected, and, in response, one or more corresponding physical network entities can be highlighted within the interface. For example, in the embodiment of FIG. 3b, the virtual machine 330 is selected, and in response, the physical machine 332 implementing the virtual machine 330 is identified and highlighted within the second interface portion 310. In addition, detailed information 334 corresponding to the selected virtual machine is accessed and displayed within the third interface portion 320. In the embodiment of FIG. 3b, types of detailed information corresponding to the selected virtual machine includes the UUID of the virtual machine, the virtual domain including the virtual machine, the server implementing the virtual machine, the last activity associated with the virtual machine, the interface name corresponding to the virtual machine, the IP address of the virtual machine, the MAC address of the virtual machine, and the numbers of packets and bytes received by and transmitted by the virtual machine (along with the rates of receiving and transmitting packets and bytes). It should be noted that in other embodiments, additional detailed information associated with the selected virtual machine can be accessed and displayed. Similarly, when a user selects a container rather than a virtual machine, a corresponding physical machine implementing the container is highlighted within the interface.

Figure 3C:
FIG. 3c illustrates the interface of FIG. 3a with a virtual domain selected and a corresponding set of physical network entities highlighted, according to one embodiment.

FIG. 3c illustrates the interface of FIG. 3a with a virtual domain selected and a corresponding set of physical network entities highlighted, according to one embodiment. In the interface 300, one or more virtual domains can be selected, and, in response, one or more corresponding physical machines can be highlighted within the interface. For example, in the embodiment of FIG. 3c, the virtual domain 340 is selected, and in response, the set of physical machines implementing the virtual domain 340 is identified and highlighted within the second interface portion 310. Four such physical machines include servers 342 (additional servers are also highlighted in FIG. 3c, but are not numbered for the sake of simplicity). In addition, detailed information 344 corresponding to the selected virtual domain is accessed and displayed within the third interface portion 320. In the embodiment of FIG. 3c, types of detailed information corresponding to the selected virtual domain includes the UUID of the virtual domain, the topology of the virtual domain, the state of the virtual domain, the numbers of packets and bytes received by and transmitted by the virtual domain (along with the rates of receiving and transmitting packets and bytes), and the number of packets dropped by the virtual domain. In addition, an interface sub-portion corresponding to the virtual machines within the selected virtual domain can be displayed and, when selected, can expand to display a list of virtual machine identities. Likewise, a sub-portion corresponding to the physical machines implementing the virtual domain can be displayed and, when selected, can expand to display a list of physical machine identities.

Figure 3D:
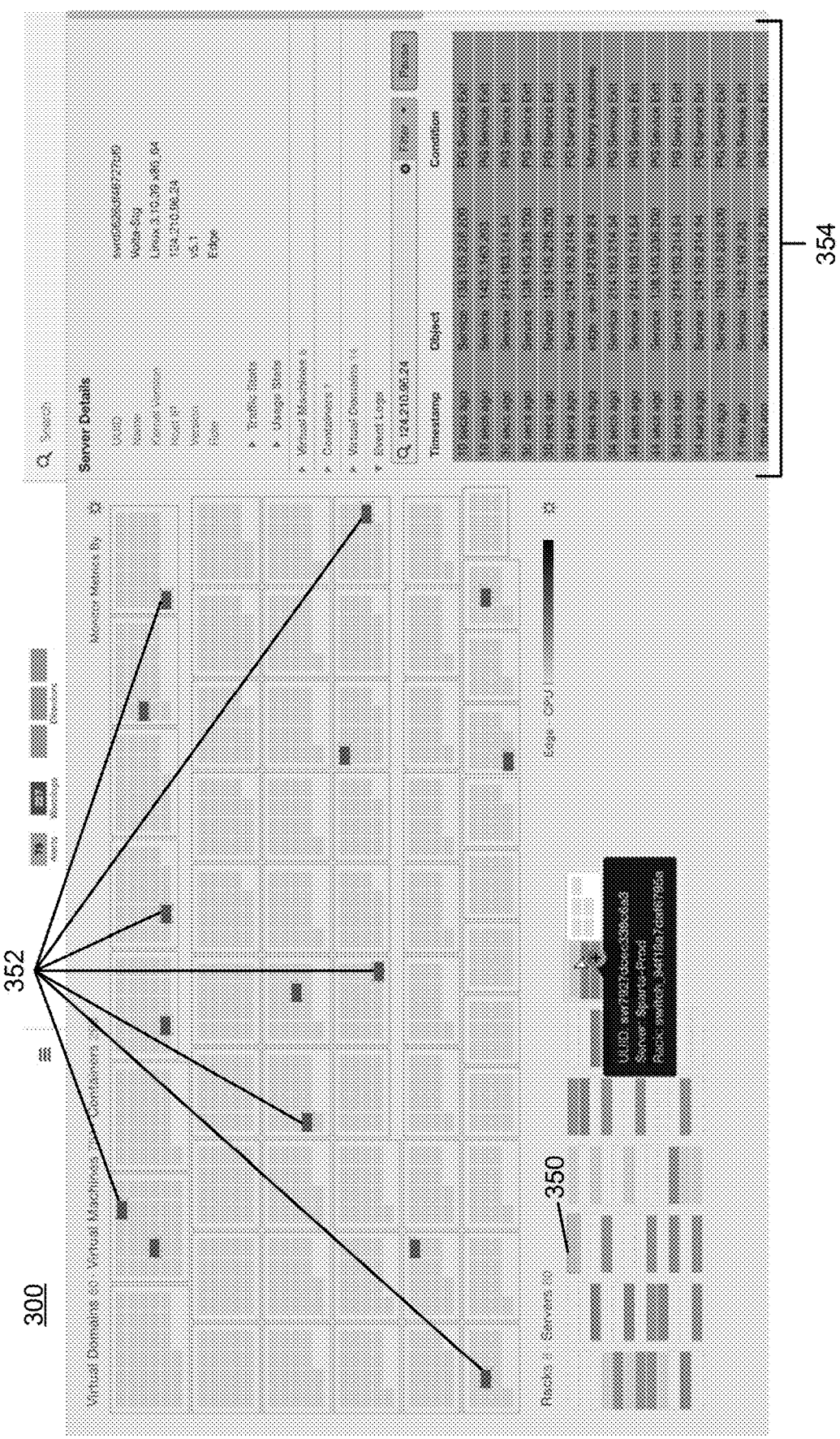
FIG. 3d illustrates the interface of FIG. 3a with a physical network entity selected and a corresponding set of virtual network entities highlighted, according to one embodiment.

FIG. 3d illustrates the interface of FIG. 3a with a physical network entity selected and a corresponding set of virtual network entities highlighted, according to one embodiment. In the interface 300, one or more physical network entities can be selected, and, in response, one or more corresponding virtual network entities (virtual machines and containers implemented by the selected physical machines) can be highlighted within the interface. For example, in the embodiment of FIG. 3d, the physical machine 350 is selected, and in response, the virtual machines and containers 352 implemented by the physical machine 350 are identified and highlighted within the first interface portion 302. For illustration purposes, not all virtual machines and container implemented by the physical machine 350 are labeled. In addition, detailed information 354 corresponding to the selected physical machine is accessed and displayed within the third interface portion 320. In the embodiment of FIG. 3d, types of detailed information corresponding to the selected physical machine 350 includes the UUID of the physical machine, the name of the physical machine, the kernel version of the physical machine, the host IP address of the physical machine, the version of the physical machine configuration, and the role of the physical machine. In addition, an interface sub-portion corresponding to the virtual machines implemented by the selected physical machine can be displayed and, when selected, can expand to display a list of the virtual machine identities. Likewise, an interface sub-portion corresponding to the containers implemented by the selected physical machine can be displayed and, when selected, can expand to display a list of the container identities. Further, a sub-portion corresponding to the virtual domains implemented at least in part by the selected physical machine can be displayed and, when selected, can expand to display information corresponding to the virtual domains. Lastly, an interface sub-portion displays event log information. The displayed event log information can be filtered by the host IP address of the physical machine such that only events related to the physical machine 350 are displayed.

Figure 3E:
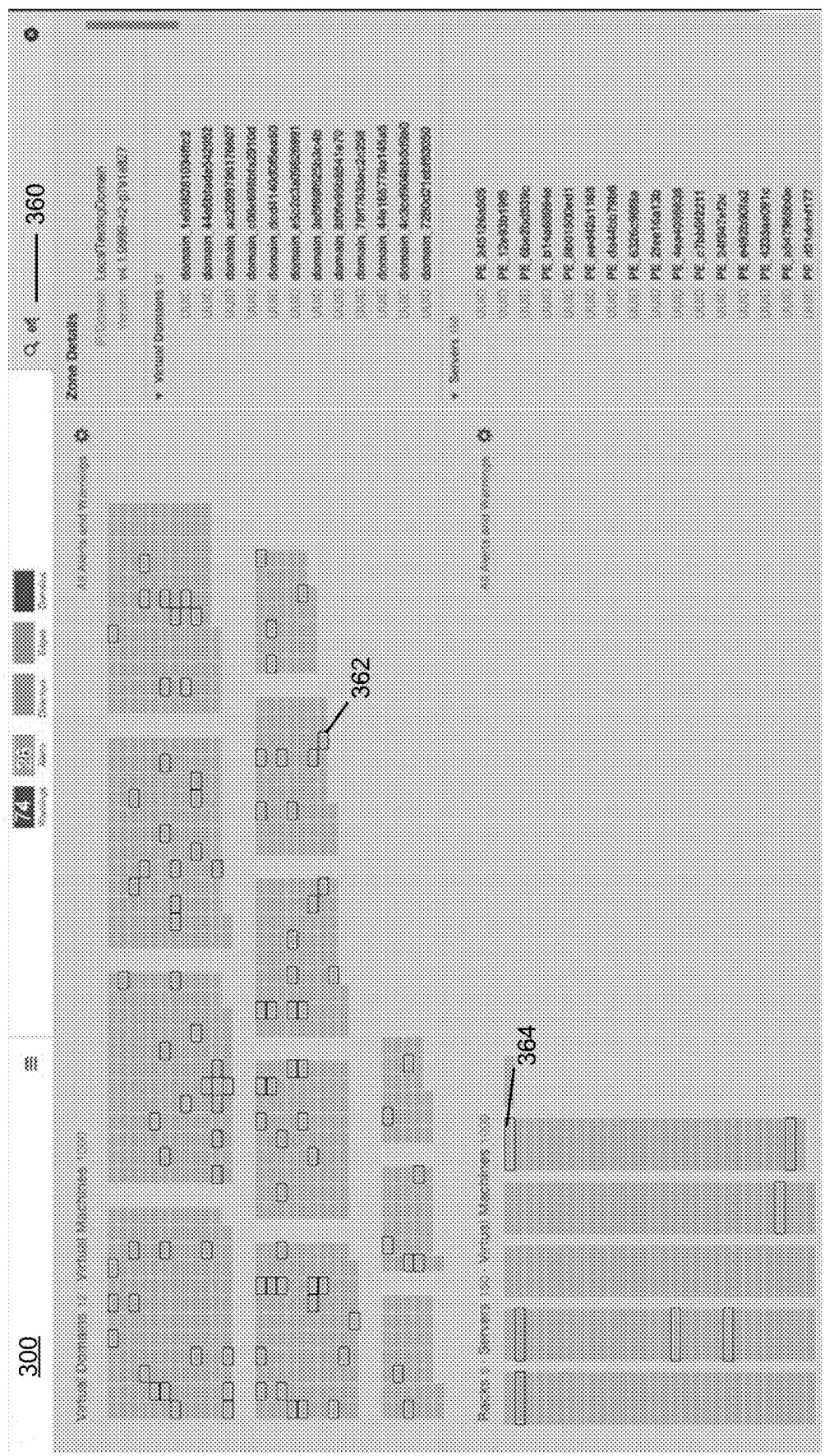
FIG. 3e illustrates the interface of FIG. 3a with a partial search query entered into a search interface and a corresponding set of network entities highlighted, according to one embodiment.

FIG. 3e illustrates the interface of FIG. 3a with a partial search query entered into a search interface and a corresponding set of network entities highlighted, according to one embodiment. In the interface 300, a search query field 360 can be included. In response to a search query or a partial search query, one or more virtual machines, one or more containers, and one or more physical machines corresponding to the search query or partial search query can be identified. For example, in the embodiment of FIG. 3e, the partial search query "ef" is entered into the search query field 360. In response (for instance, in real-time as a user is entering the search query), virtual machines and containers corresponding to the partial search query "ef" are identified and highlighted (one such virtual machine is virtual machine 362), and physical machines corresponding to the partial search query "ef" are identified and highlighted (one such physical machine is physical machine 364). As referred to herein, a virtual machine, a container, or a physical machine that corresponds to a search query or partial search query can include a virtual machine, a container, or a physical machine with a name or other identifier that includes at least part of the search query or partial search query, with an IP or MAC address associated with the search query or partial search query, or with any other property or characteristic associated with the search query or partial search query.

Figure 3F:
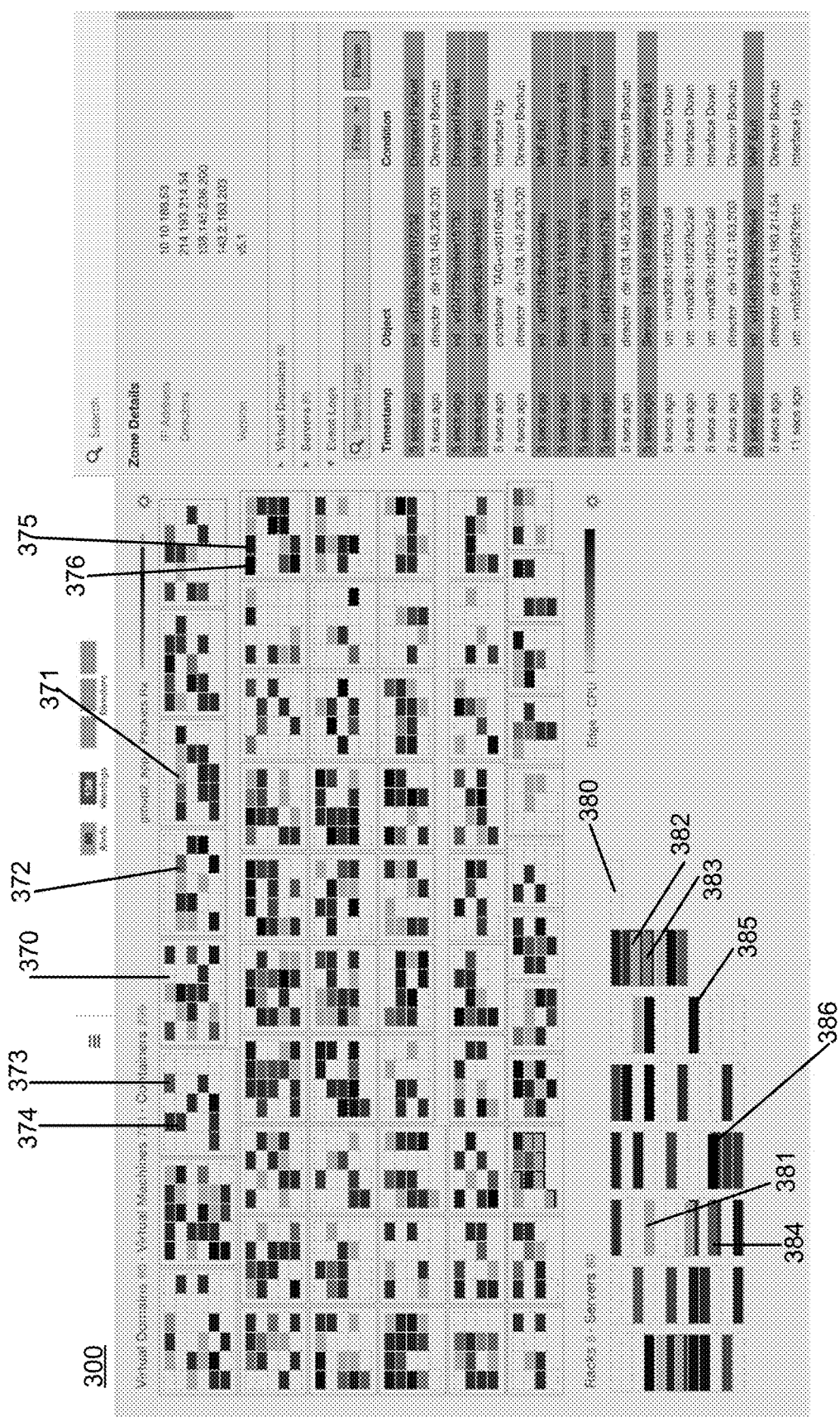
FIG. 3f illustrates the interface of FIG. 3a with usage statuses of network entities highlighted, according to one embodiment.

FIG. 3f illustrates the interface of FIG. 3a with usage statuses of network entities highlighted, according to one embodiment. The usage statuses indicate to a user of the network manager 250 the usage of the network resources according to one or more parameters such as incoming network traffic, outgoing network traffic, memory usages, CPU usages, and the like. In the embodiment of FIG. 3f, in the first interface portion, network entities such as virtual machines and containers are classified according to incoming network traffic by status, including "normal operation" (indicated by rectangles of a first set of shades, such as the virtual machines 370-372), "warning" (indicated by rectangles of a second set of shades, such as the virtual machine 373-374), and "alert" (indicated by rectangles of a third set of shades, such as the virtual machine 375-376). In the second interface portion, network entities such as servers are classified according to CPU usages into a status of "normal operation" (indicated by rectangles of the first set of shades, such as servers 380-382), "warning" (indicated by rectangles of the second set of shades, such as the server 383-384), and "alert" (indicated by rectangles of the third set of shades, such as the server 385-386). Within each status classification, different shades are used to indicate the levels of usage. For example, in the "normal operation" category, darker shades indicate more heavy usage. It should be noted that the virtual machines can be classified based on any number of statuses and based on any usage parameter. Such classifications can be represented using any suitable colors (for instance, each status can be represented by a different color), or by any other graphic representation (such as a pattern, an animation, a texture, icon, highlighted icon, and the like). Classifications of network entities, statuses of usages, usage parameters, and displays of classifications can be configured by users as further described with respect to FIG. 3g.

Based on the statuses information of various network entities presented, a user can take different remedial actions. As one example, after determining that a particular virtual domain's traffic is behaving abnormally, a user can take one or more remedial actions. For instance, a user may tap traffic from the particular virtual domain for further analysis; trace the virtual topology in that virtual domain to determine where packets are getting dropped; identify the virtual machines (and/or containers) that are generating abnormal amount of traffic and rate limit these virtual machines (or containers); migrate virtual machines (or containers) in the virtual domain to a backup virtual domain while debugging is in progress to prevent production traffic disruption; or adapt virtual topologies to avoid traffic deadlocks or to divide the traffic across multiple virtual domains. As another example, after determining that a particular virtual machine or container's traffic pattern is abnormal, a user can take one or more remedial actions. For instance, a user may migrate the impacted virtual machine (or container) to another server(s) that is not heavily used if the server(s) hosting the impacted virtual machine or container is determined to be resource starved; increase the amount of physical resources (e.g., CPU, memory, disk, or Input/Output) assigned to that virtual machine (or container); rate limit the amount of traffic to or from the impacted virtual machine (or container); or adapt virtual topologies to avoid traffic deadlocks or to divide the traffic across multiple virtual domains.

As a further example, after determining that a particular server's traffic pattern is abnormal, a user can take one or more remedial actions. For instance, a user may: migrate the virtual machine (or container) to another server(s) that is not heavily used if the server(s) hosting the impacted virtual machine or container is determined to be resource starved; add one or more servers to the cluster including the particular server to increase the capacity of the virtual environment if all servers of the cluster are determined to be over utilized; replace resources (e.g., bad hard disk, memory, or Network Interface Controller (NIC)) of the particular server that are determined to be degraded; re-route the server through another port if an entire rack of the particular server is determined to have problems; or tap traffic from the server to another location for further debugging. As yet another further example, after determining that a particular server's CPU or memory utilization is anomalous, a user can take one or more actions such as increasing the sources (e.g., hard disk, memory, CPU, etc.) on the impacted server, replacing any faulty hardware, or changing the top-of-the-rack switch.

Figure 3G:
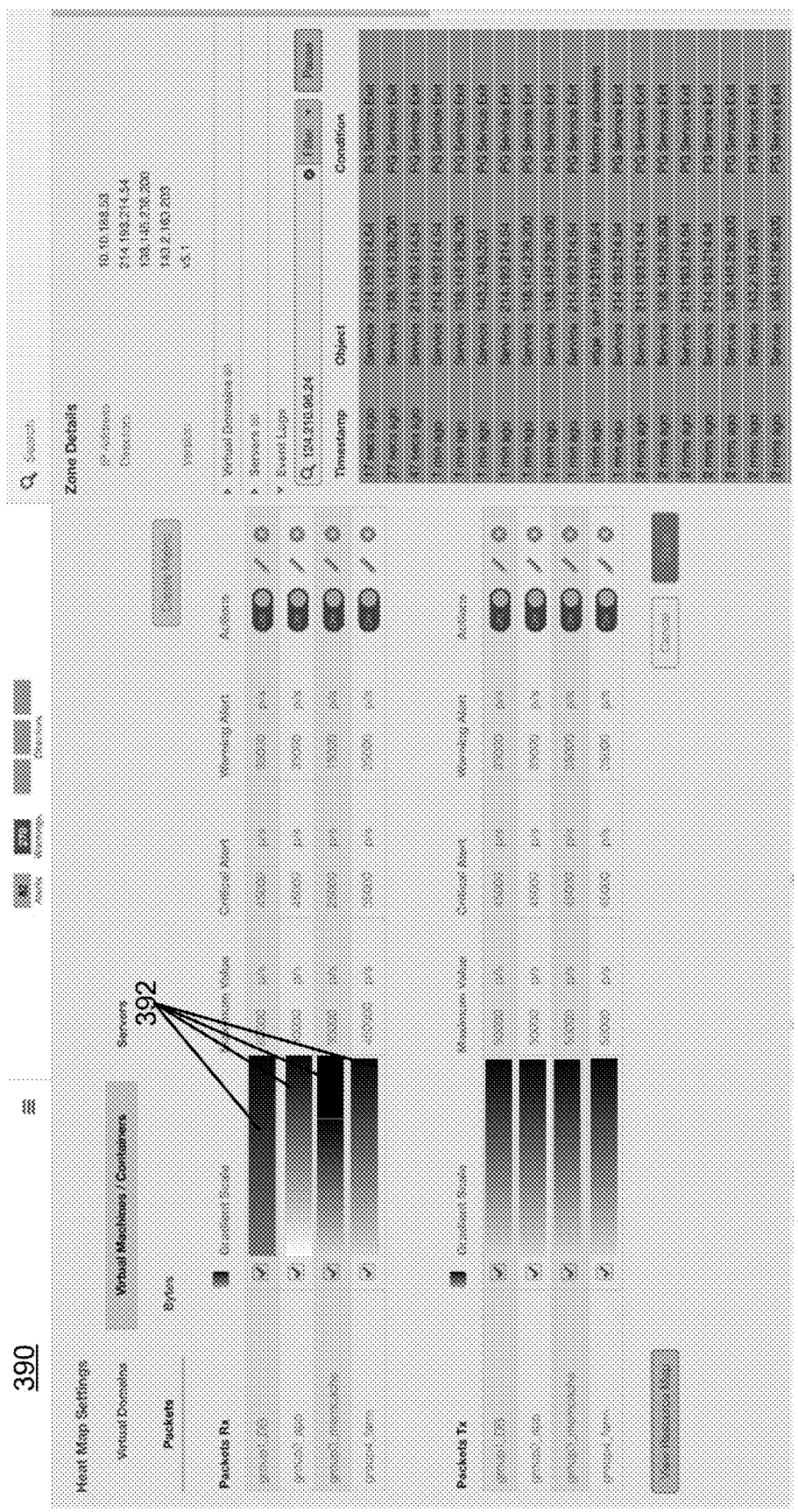
FIG. 3g illustrates an interface for users to configure the classification and display of usage statuses of network entities, according to one embodiment.

FIG. 3g illustrates an interface for users to configure the classification and display of usage statuses of network entities, according to one embodiment. The interface 390 allows a user to configure which network entities need to be classified, to configure network parameters according to which the network entities are classified, to configure one or more criteria of classifying network entities usage, to configure one or more criteria of displaying network entities classifications, and the like. For example, as illustrated, a user configures classifying virtual machines and containers according to the incoming traffic measured according to the parameter of packets received. The user further organizes the virtual machines and container into groups (e.g., "group1_DB", "group2_app", "group3_memacache", "group4_farm") and manages the classification of virtual machines and containers, and the display of classifications of virtual machines and containers on a group level. The interface 390 includes a gradient scale interface 392 that a user can adjust to configure the thresholds of different classification categories (e.g., "normal operation," "warning," "alert") used to classify network entities based on the packets received as well as the criteria of displaying the classification categories. By using the gradient scale, network entities can be classified on a sliding scale according to the incoming packets traffic. Network entities can be classified and displayed based on the usage on a granularity level. Users can visually distinguish network entities of different classification categories and can visually distinguish network entities of different degrees of usage within each classification category. Using the interface 390, users can recognize over- and under-utilized network entities, and can take different actions to ensure that the network entities are utilized properly. For example, a user can restart a machine, a director, a network interface, and the like.

Figure 4A:
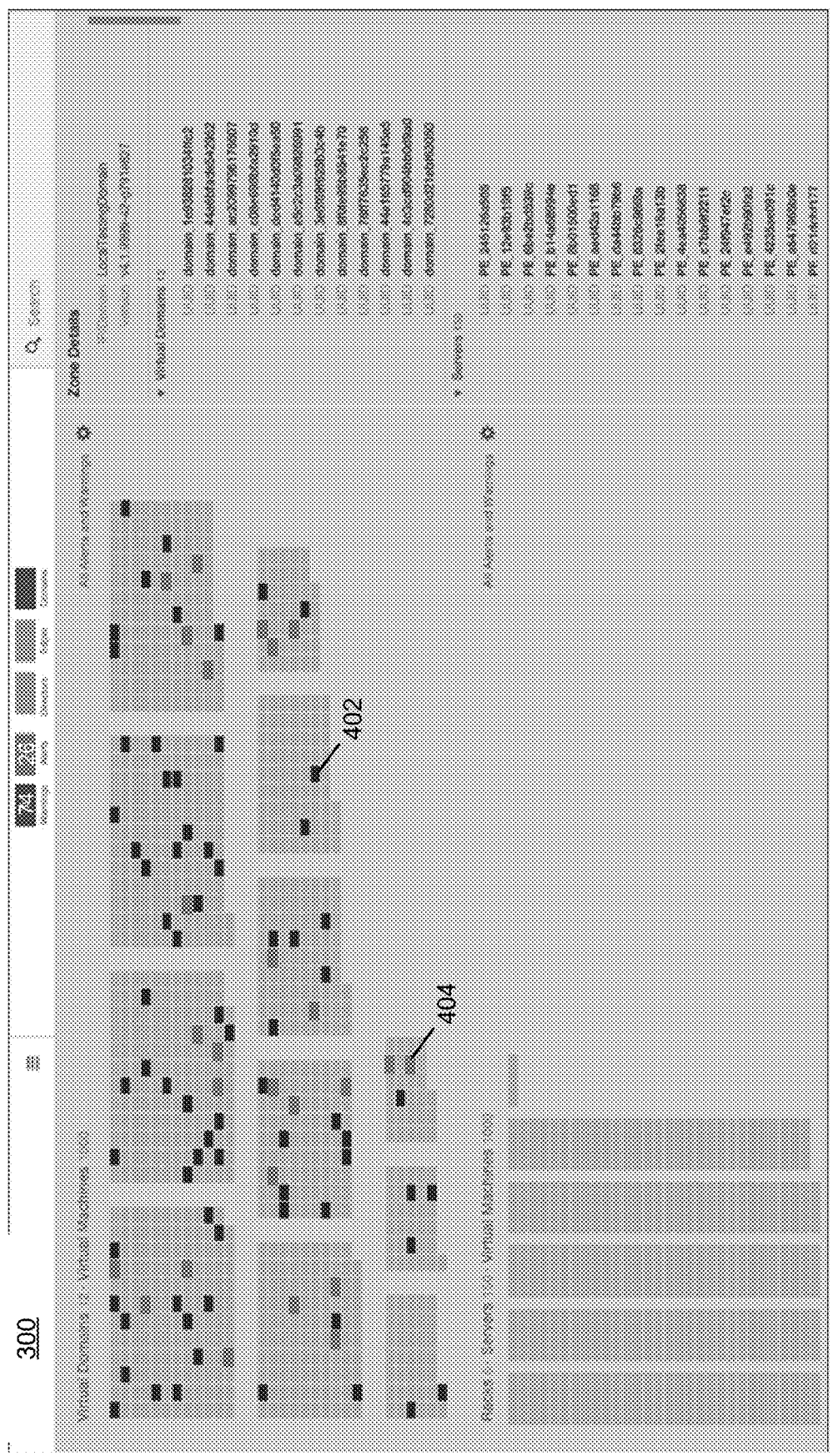
FIG. 4a illustrates the interface of FIG. 3a with virtual network entities highlighted based on a status of the virtual network entity, according to one embodiment.

FIG. 4a illustrates the interface of FIG. 3a with virtual network entities highlighted based on a status of the virtual network entity, according to one embodiment. In the embodiment of FIG. 4a, each virtual network entity (e.g., a virtual machine, a container) is classified by a status of "normal operation" (indicated by grey rectangles), "warning" (indicated by dark blue rectangles, such as the virtual machine 402), and "alert" (indicated by light blue rectangles, such as the virtual machine 404). It should be noted that the virtual network entities can be classified based on any number of statuses, based on any virtual machine property or characteristic, or based on any performance metric. Such classifications can be represented using any suitable colors (for instance, each status can be represented by a different color), or by any other graphic representation (such as a pattern, an animation, a texture, and the like). In some embodiments, virtual machines are classified according to how imminent a virtual machine crash is, how likely a virtual machine is to stall or become a processing bottleneck, the presence or risk or a security threat or attack, and the like. Classifications corresponding to similar levels of danger or performance issues can be represented by the same graphic representation (for instance, virtual machines at risk of severe security threats and severe performance issues can be represented by light blue rectangles, virtual machines at risk of mild security threats and mild performance issues can be represented by dark blue rectangles, and the like). It should be noted that the interface 300 can include a count of virtual machines classified based on each classified (for instance, the top portion of the interface 300 indicates that 74 virtual machines are classified based on a "warning" status, and 26 are classified based on an "alert" status. In some embodiments, a user of the network manager 250 can select the metrics used to classify the status of each virtual network entity, and the corresponding thresholds or values that trigger statuses associated with the user selected metrics.

Figure 4B:
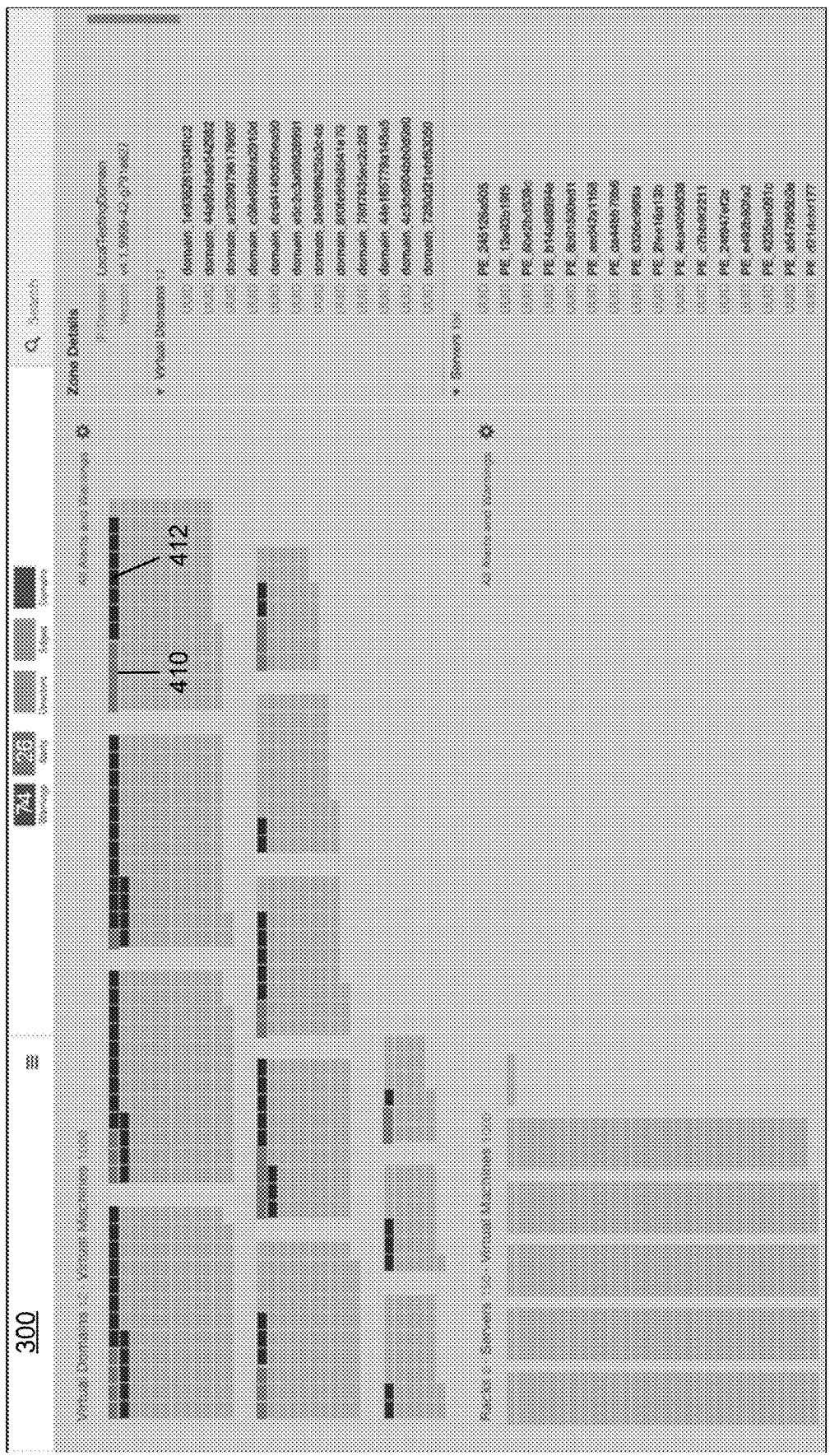
FIG. 4b illustrates the interface of FIG. 4a with virtual network entities organized within each virtual domain by virtual network entity status, according to one embodiment.

FIG. 4b illustrates the interface of FIG. 4a with virtual network entities organized within each virtual domain by virtual network entity status, according to one embodiment. The interface 300 can enable a user to configure the interface such that similarly-classified virtual machines are displayed within each virtual domain in clusters. For instance, the interface 300 can include a cluster switch that, when selected by a user, organizes the classified virtual machines displayed in FIG. 4a into clusters as displayed in FIG. 4b. In the embodiment of FIG. 4b, each virtual domain is displayed with virtual machines classified as "alert" status first (within the rectangle cluster of each virtual domain from left to right and top to bottom), followed by the virtual machines classified as "warning" status. For example, the cluster 410 of "alert" status virtual machines within a corresponding virtual domain is displayed at the top left cluster of the virtual domain, followed by the cluster 412 of "warning" status virtual machines.

Figure 5A:
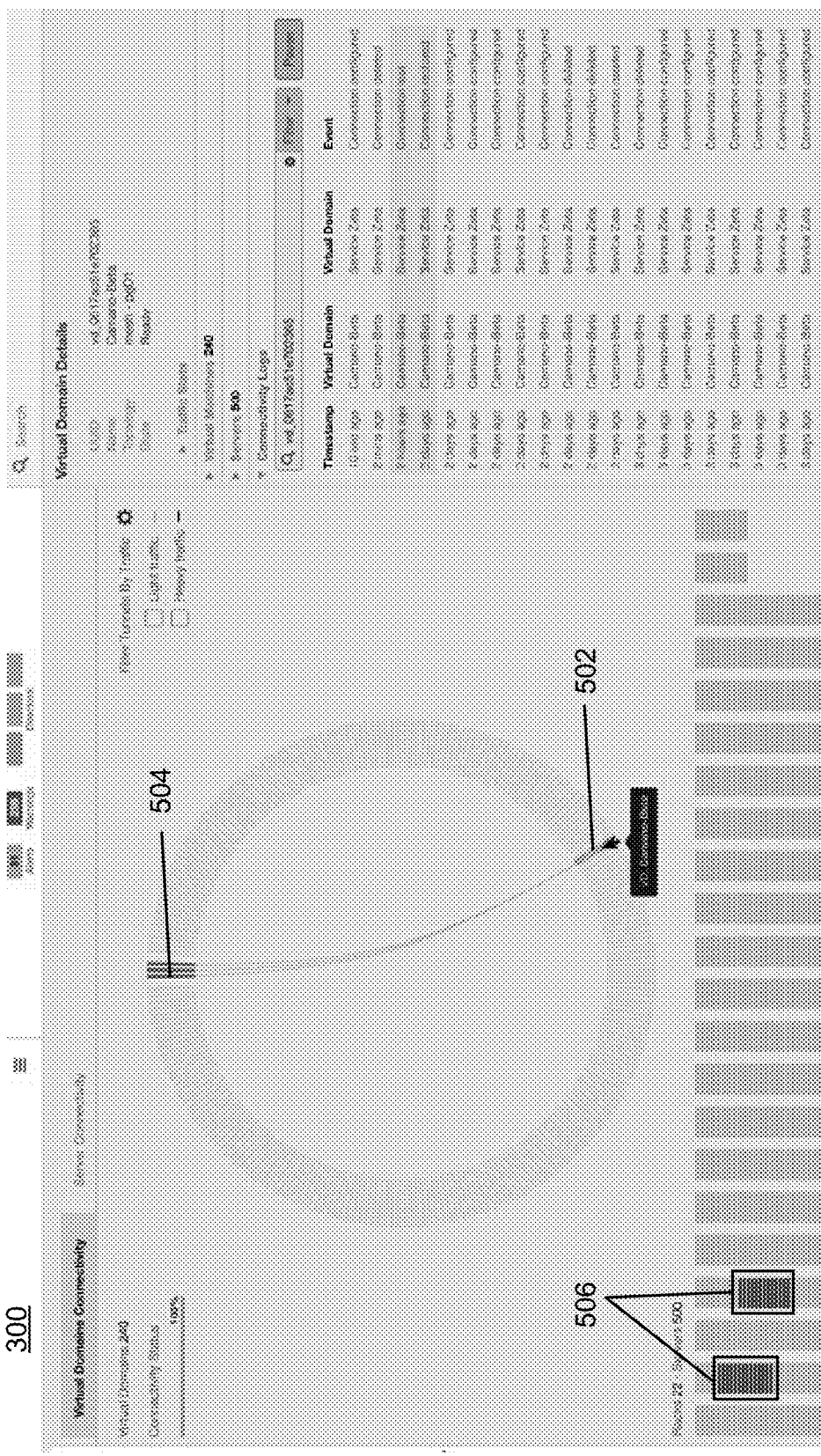
Figure 5C:
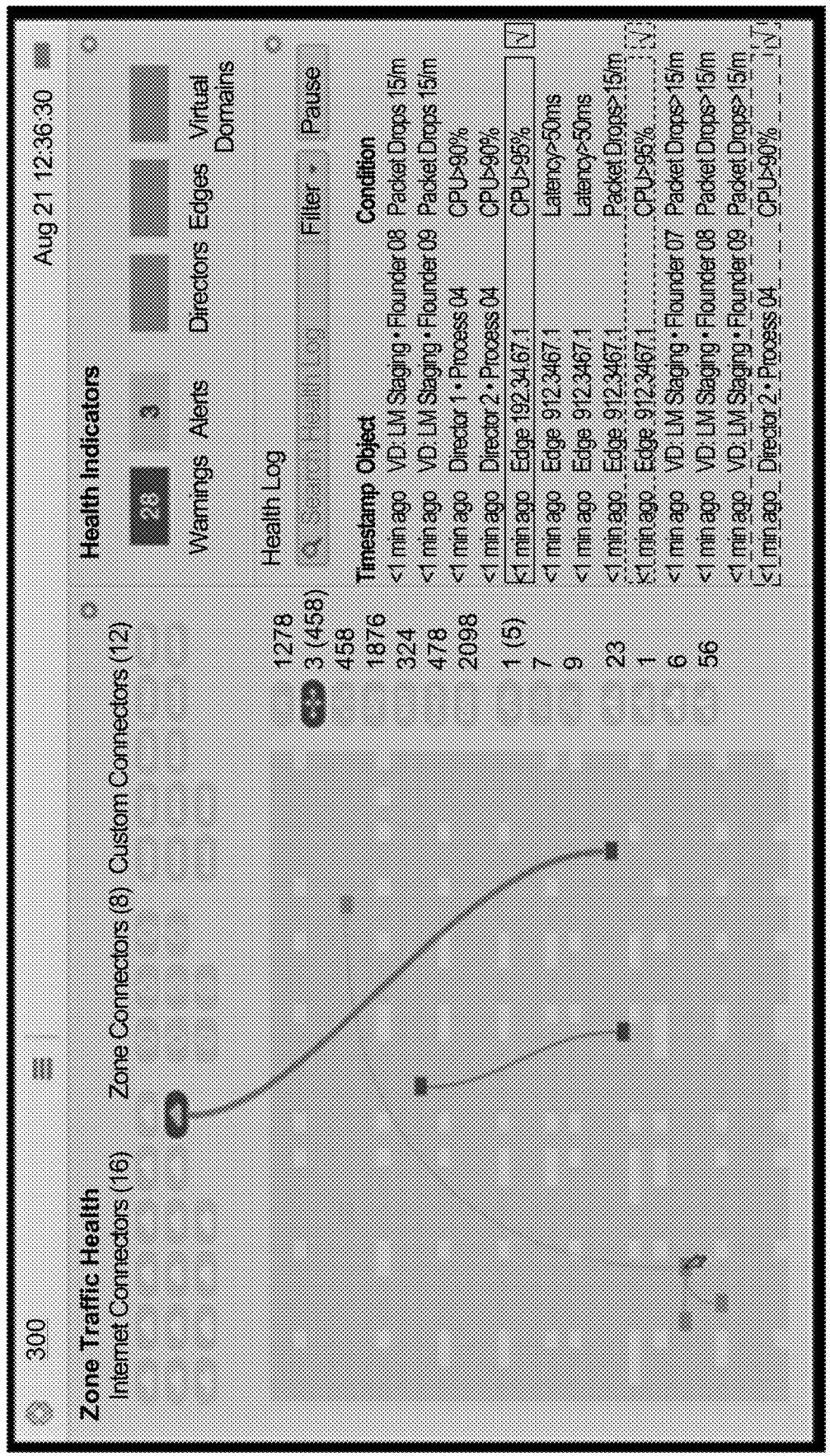
Figure 5D:
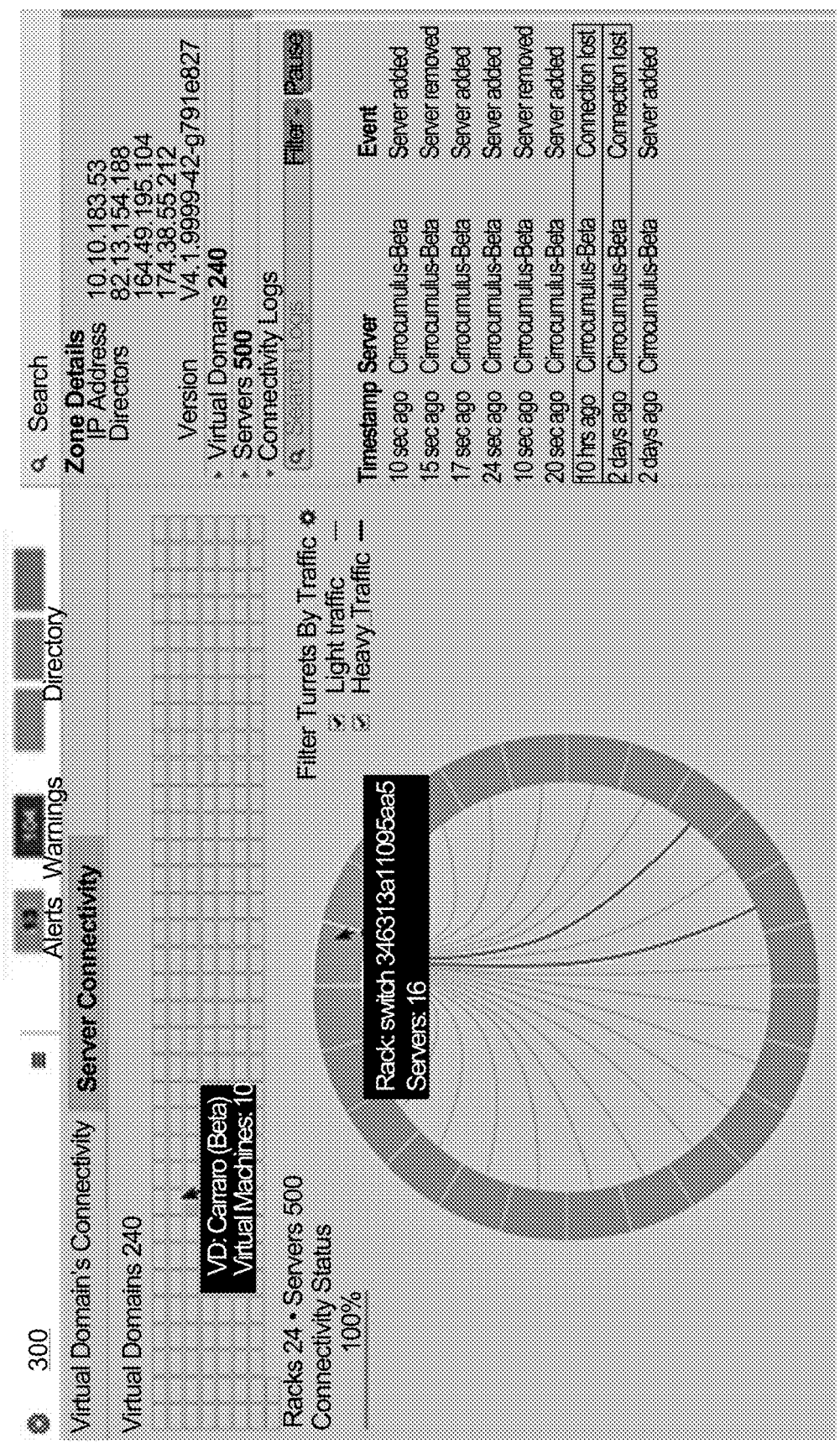

FIGS. 5a through 5d illustrate interfaces displaying connections between virtual network entities, according to one embodiment. In the embodiment of FIG. 5a, a circular interface is displayed in a first interface portion indicating the relationship between virtual domains (e.g., between the virtual domains 502 and 504) and the physical servers (e.g., the servers 506) implementing a virtual domain (e.g., the virtual domain 502). Detailed information illustrating the health of various virtual domain entities is displayed in a second interface portion. In the embodiment of FIG. 5b, a circular interface is displayed in a first interface portion indicating the relationship between virtual machines in a particular virtual domain, between virtual machines and other virtual domains, between virtual machines and Internet locations or resources, and between virtual machines and other virtual network locations or resource (as with the embodiment of FIG. 5a, detailed information illustrating the health of various virtual domain entities is displayed in a second interface portion). In the embodiment of FIG. 5c, an interface is displayed in a first interface portion indicating the relationship between virtual domains, and between virtual domains and locations and/or resources external to the virtual domains (as with the embodiment of FIG. 5a, detailed information illustrating the health of various virtual domain entities is displayed in a second interface portion). In the embodiment of FIG. 5d, in a first interface portion, an interface indicating all virtual domains and a circular interface indicating the relationship between physical servers implementing a particular virtual domain are displayed. Detailed information illustrating the health of various servers is displayed in a second interface portion.

Figure 6A:
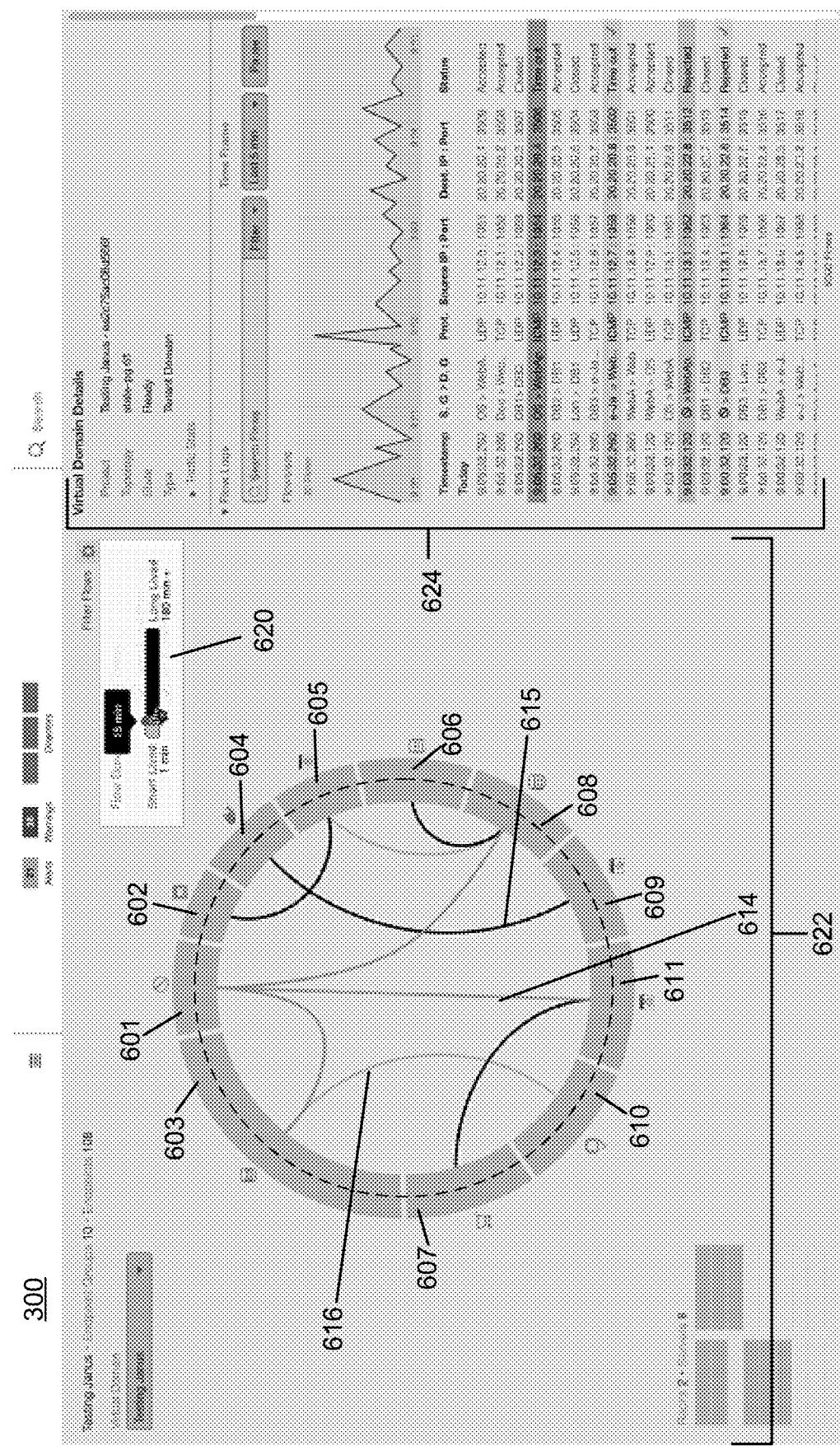
FIGS. 6a through 6c illustrate interfaces displaying connections between virtual network entities, according to one embodiment.
Figure 6B:
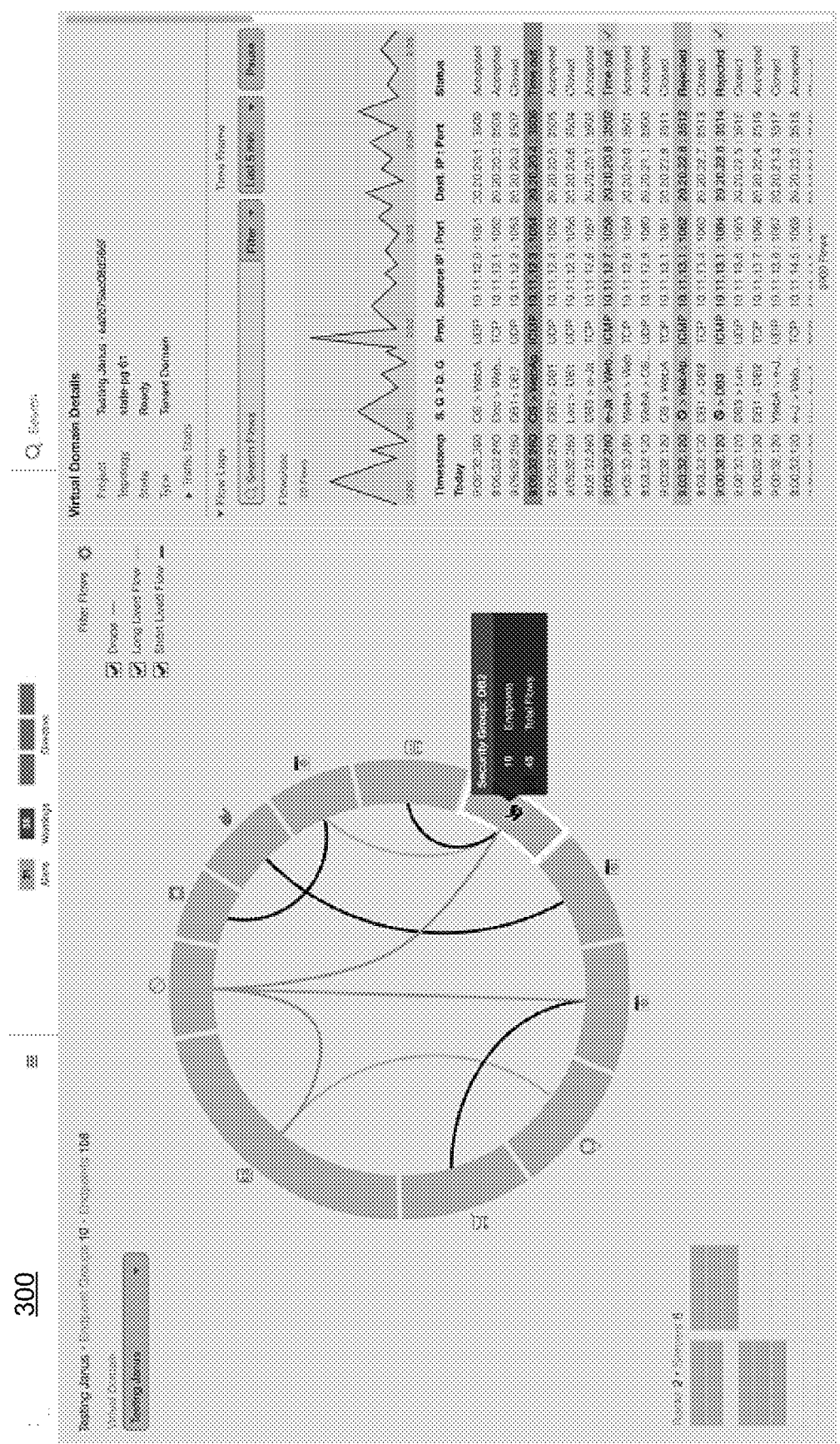
Figure 6C:

FIGS. 6a through 6c illustrate interfaces displaying connections between virtual network entities, according to one embodiment. In the embodiment of FIG. 6a, a circular interface is displayed in a first interface portion 622 indicating the interfacing between groups of network entities. The circular interface includes multiple arc segments 601-611, each of which corresponds to a virtual network entity group. A virtual network entity group includes one or more network entities that are used for one particular purpose. Users can define various virtual network entity groups to organize network entities. Users can further define access rules to regulate access rights of virtual network entity groups. A virtual network entity group can be associated with one or more access rules identifying one or more other virtual network entity groups permitted to access the virtual network entity group. Virtual network entity groups can be identified by and represented by icons. For example, the virtual network entity groups 603, 606, and 608 correspond to data storage groups and each include network entities used for data storage purpose, and the virtual network entity groups 605, 609, and 611 correspond to web application groups and each include network entities used for web application purpose. Other example virtual network entity groups include internet groups, application groups, security groups, administrative groups, and the like. Each arc segment includes an outer half and an inner half, which are divided by a medial axis of the arc segment. For each arc segment, the outer half represents virtual network entities included in a particular virtual network entity group and the inner half represents physical network entities included in the particular virtual network entity group (e.g., physical entities that run or instantiate one or more of the corresponding virtual network entities included in the virtual network entity group).

A line connecting a virtual network entity group to another virtual network entity group represents a connection or interface between the virtual network entity groups coupling the arc segments. Each connection is classified by a status of "access violation" (indicated by lines of a first shade, such as the line 614), "short term" (indicated by lines of a second shade, such as the line 615), and "long term" (indicated by lines of a third shade, such as the line 616). Connections between virtual network entity groups can be classified according to the associated access policies. Connections between virtual network entity groups are classified as "access violation" when the interfacings violate the access rules associated with the virtual network entity groups. For example, events such as dropped packets, a network entity being accessed by another network entity that is unidentified or prohibited by access rules, or improper configurations are classified as "access violation." Connections between virtual network entity groups can also be classified as "short term" (or "long term") when the interfacings last shorter (or longer) than a threshold interval of time. Users can configure setting threshold intervals of time via the interface 620. It should be noted that the connections between virtual network entity groups can be classified based on any number of statuses, based on any access rules, or based on network group accessing permissions or policies. Such classifications can be represented using any suitable shades or colors (for instance, each status can be represented by a different color or shade), or by any other graphic representation (such as a pattern, an animation, a texture, icon, highlighted icon, and the like). Lines can be displayed with arrows to indicate a direction of packets flow from a source network entity that sends the packets to a destination network entity that receives the packets. Detailed information illustrating the health of interfacings between virtual network entity groups is displayed in a second interface portion 624 adjacent to the first interface portion 622.

FIG. 6b illustrates the interface of FIG. 6a where detailed information associated with a virtual network entity group is displayed, according to one embodiment. The interface 300 provides detailed information of a virtual network entity group in response to detecting a cursor being placed close to the network entity group (or in response to the selection of the network entity group by a user). As illustrated, a security group associated with the network entity group, a number of network entities (i.e., endpoints) included in the network entity group, and a number of flows associated with the virtual network entity group are all displayed in a pop-up window overlaid within the first interface portion in the embodiment of FIG. 6b. FIG. 6c illustrates the interface of FIG. 6a where connections associated with a particular virtual network entity group are displayed, according to one embodiment. Users can select a particular virtual network entity group (e.g., virtual network entity group 602, which includes unclassified network entities) to display only interfacings related to the selected network entity group. In addition, in a second interface portion, detailed information illustrating the health of the interfacings associated with the selected virtual network entity group is displayed. It should be noted that users can select one or more virtual network entities and/or one or more physical network entities to display interfacings associated with the selected network entities.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated through the figures. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system, e.g. configured as described in FIG. 1) or one or more hardware modules of a computer system (e.g., a processor or a group of processors, e.g., 102) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules and may be comprised of instructions stored in a storage unit, e.g., 116 and/or memory 104.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for managing a virtual network through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A network management system for managing a virtual network, comprising:

an interface system communicatively coupled to one or more servers, the one or more servers implementing a virtual network including one or more virtual machines and one or more containers organized into one or more virtual domains, the interface system configured to generate a graphical user interface displaying graphical representations of the one or more virtual machines and the one or more containers in a circular interface comprising two or more arc segments in a first portion of the graphical user interface, wherein a first arc segment is connected to a second arc segment via a line, wherein a shade of the line indicates a status of a connection, displaying graphical representations of the one or more servers in a second portion of the graphical user interface, and displaying information associated with the virtual network in a third portion of the graphical user interface;

a director engine configured to:
 receive, from a user of the network management system, a selection of at least one server, virtual machine, container, or virtual domain;
 query instrumentation data stored by the one or more servers to access information associated with the selected at least one server, virtual machine, container, or virtual domain;
 query the one or more servers to identify one or more of servers, virtual machines, containers, and virtual domains associated with the selected at least one server, virtual machine, container, or virtual domain: and
 modify the first portion of the graphical user interface and the second portion of the graphical user interface to highlight the selected at least one server, virtual machine, container, or virtual domain, and to highlight the identified one or more servers, virtual machines, containers, and virtual domains associated with the selected server, virtual machine, container, or virtual domain; and modify the third portion of the graphical user interface to display the accessed information associated with the selected server, virtual machine, container, or virtual domain; and a configuration engine configured to, in response to a request from the user of the network management system, re-configure the selected server, virtual machine, container, or virtual domain.

2. The network management system of claim 1, wherein the one or more servers store a mapping between network entities and wherein querying the one or more servers comprises querying the mapping stored by the one or more servers using the selected at least one server, virtual machine, container, or virtual domain to identify the one or more of servers, virtual machines, containers, and virtual domains mapped to the selected at least one server, virtual machine, container, or virtual domain.

3. The network management system of claim 2, wherein the mapping between network entities comprises a mapping between a server and a virtual network entity implemented by the server.

4. The network management system of claim 2, wherein the mapping between network entities comprises a mapping between a first virtual network entity and a second virtual network entity communicatively coupled to the first virtual network entity.

5. The network management system of claim 1, wherein querying the instrumentation data stored by the one or more servers to access information associated with the selected at least one server, virtual machine, container, or virtual domain comprises determining a property of the selected at least one server, virtual machine, container, or virtual domain and comparing the property of the selected at least one server, virtual machine, container, or virtual domain to a predetermined threshold value to classify a status of the selected at least one server, virtual machine, container, or virtual domain.

6. The network management system of claim 5, wherein modifying the first portion of the graphical user interface and the second portion of the graphical user interface comprises indicating the status of the selected at least one server, virtual machine, container, or virtual domain.

7. The network management system of claim 1, wherein the querying the logs stored by the one or more servers to access information associated with the selected at least one server, virtual machine, container, or virtual domain comprises identifying network traffic associated with the selected at least one server, virtual machine, container, or virtual domain and comparing the network traffic associated with the selected at least one server, virtual machine, container, or virtual domain to an access rule associated with the selected at least one server, virtual machine, container, or virtual domain to classify a status of the identified network traffic.

8. The network management system of claim 7, wherein the modifying the first portion of the graphical user interface and the second portion of the graphical user interface comprises indicating the status of the identified network traffic.

9. The network management system of claim 1, further comprising a query engine configured to receive a query from a query field displayed on the graphical user interface and to search for at least one virtual machine, container, virtual domain, or log entry based on the received query.

10. A computer-implemented method of managing a virtual network implemented by one or more servers that includes one or more virtual machines and one or more containers organized into one or more virtual domains, comprising:

generating, by a network management system, a graphical user interface displaying graphical representations of the one or more virtual machines and the one or more containers in a circular interface comprising two or more arc segments in a first portion of the graphical user interface, wherein a first arc segment is connected to a second arc segment via a line, wherein a shade of the line indicates a status of a connection, displaying graphical representations of the one or more servers in a second portion of the graphical user interface, and displaying information associated with the virtual network in a third portion of the graphical user interface;

receiving, from a user of the network management system, a selection of at least one server, virtual machine, container, or virtual domain;

querying logs stored by the one or more servers to access information associated with the selected at least one server, virtual machine, container, or virtual domain;

querying the one or more servers to identify one or more of servers, virtual machines, containers, and virtual domains associated with the selected at least one server, virtual machine, container, or virtual domain;

modifying the first portion of the graphical user interface and the second portion of the graphical user interface to highlight the selected at least one server, virtual machine, container, or virtual domain, and to highlight the identified one or more servers, virtual machines, containers, and virtual domains associated with the selected server, virtual machine, container, or virtual domain;

modifying the third portion of the graphical user interface to display the accessed information associated with the selected server, virtual machine, container, or virtual domain; and in response to a request from the user of the network management system, reconfiguring the selected server, virtual machine, container, or virtual domain.

11. The computer-implemented method of claim 10, wherein the one or more servers store a mapping between network entities and wherein querying the one or more servers comprises querying the mapping stored by the one or more servers using the selected at least one server, virtual machine, container, or virtual domain to identify the one or more of servers, virtual machines, containers, and virtual domains mapped to the selected at least one server, virtual machine, container, or virtual domain.

12. The computer-implemented method of claim 10, wherein the mapping between network entities comprises a mapping between a server and a virtual network entity implemented by the server.

13. The computer-implemented method of claim 11, wherein the mapping between network entities comprises a mapping between a first virtual network entity and a second virtual network entity communicatively coupled to the first virtual network entity.

14. The computer-implemented method of claim 10, wherein querying the logs stored by the one or more servers to access information associated with the selected at least one server, virtual machine, container, or virtual domain comprises determining a property of the selected at least one server, virtual machine, container, or virtual domain and comparing the property of the selected at least one server, virtual machine, container, or virtual domain to a predetermined threshold value to classify a status of the selected at least one server, virtual machine, container, or virtual domain.

15. The computer-implemented method of claim 14, wherein modifying the first portion of the graphical user interface and the second portion of the graphical user interface comprises indicating the status of the selected at least one server, virtual machine, container, or virtual domain.

16. The computer-implemented method of claim 10, wherein querying the logs stored by the one or more servers to access information associated with the selected at least one server, virtual machine, container, or virtual domain comprises identifying network traffic associated with the selected at least one server, virtual machine, container, or virtual domain and comparing the network traffic associated with the selected at least one server, virtual machine, container, or virtual domain to an access rule associated with the selected at least one server, virtual machine, container, or virtual domain to classify a status of the identified network traffic.

17. The computer-implemented method of claim 16, wherein modifying the first portion of the graphical user interface and the second portion of the graphical user interface comprises indicating the status of the identified network traffic.

18. The computer-implemented method of claim 10, further comprising receiving a query from a query field displayed on the graphical user interface and searching for at least one virtual machine, container, virtual domain, or log entry based on the received query.

* * * * *

UNITED STATES PATENT AND TRADEMARK OFFICE
CERTIFICATE OF CORRECTION

PATENT NO. : 10,630,557 B2
APPLICATION NO. : 15/292064
DATED : April 21, 2020
INVENTOR(S) : Max Bielenberg et al.

Page 1 of 1

It is certified that error appears in the above-identified patent and that said Letters Patent is hereby corrected as shown below:

In the Claims

Column 23, Lines 19-20 should read:
selected at least one server, virtual machine, container, or virtual domain.

Signed and Sealed this
Twenty-second Day of September, 2020

Andrei Iancu
*Director of the United States Patent and Trademark Office*